(12) United States Patent
Kile

(10) Patent No.: US 11,277,958 B1
(45) Date of Patent: Mar. 22, 2022

(54) CUTTING HEADS AND AGRICULTURAL SEEDER IMPLEMENTS FORMED THEREWITH

(71) Applicant: Ronald J. Kile, Rosalia, WA (US)

(72) Inventor: Ronald J. Kile, Rosalia, WA (US)

( * ) Notice: Subject to any disclaimer, the term of this patent is extended or adjusted under 35 U.S.C. 154(b) by 565 days.

(21) Appl. No.: 16/044,466

(22) Filed: Jul. 24, 2018

Related U.S. Application Data

(63) Continuation of application No. 15/228,426, filed on Aug. 4, 2016, now Pat. No. 10,051,778.

(51) Int. Cl.
| | | |
|---|---|---|
| *A01C 5/06* | (2006.01) | |
| *A01C 7/06* | (2006.01) | |
| *A01C 23/02* | (2006.01) | |
| *A01C 7/20* | (2006.01) | |

(52) U.S. Cl.
CPC ............... *A01C 5/062* (2013.01); *A01C 7/06* (2013.01); *A01C 7/206* (2013.01); *A01C 23/025* (2013.01)

(58) Field of Classification Search
CPC ........... A01C 5/062; A01C 7/06; A01C 7/206; A01C 23/025; A01C 23/023
See application file for complete search history.

(56) References Cited

U.S. PATENT DOCUMENTS

| | | | | |
|---|---|---|---|---|
| 3,447,495 A | * | 6/1969 | Weseloh, Jr. ........ | A01C 23/025 111/120 |
| 4,073,152 A | * | 2/1978 | Kishitani ............. | A01C 23/025 111/124 |
| 4,770,112 A | * | 9/1988 | Neumeyer ............... | A01C 5/06 111/186 |
| 4,825,959 A | * | 5/1989 | Wilhelm ............. | A01C 23/025 111/119 |
| 4,798,151 A | | 7/1989 | Rodregues, Jr. et al. | |
| 5,240,080 A | * | 8/1993 | Bassett ................... | A01B 39/22 111/119 |
| 5,271,342 A | * | 12/1993 | Neidhardt ............ | A01C 23/025 111/119 |
| 5,495,814 A | | 3/1996 | Primus | |
| 5,537,942 A | * | 7/1996 | Wickstrom ............ | A01C 5/062 111/188 |
| 7,096,803 B2 | * | 8/2006 | Bergen ................... | A01C 5/062 111/124 |
| 7,669,537 B1 | * | 3/2010 | Hall ....................... | A01C 5/062 111/156 |
| 8,869,717 B2 | | 10/2014 | Memory et al. | |
| 8,978,564 B2 | | 3/2015 | Hagny | |
| 9,271,440 B2 | | 3/2016 | Turko et al. | |
| 2004/0187753 A1 | * | 9/2004 | Robillard ............. | A01B 15/025 111/152 |
| 2005/0160954 A1 | * | 7/2005 | Linnebur ............... | A01C 5/062 111/152 |
| 2008/0257238 A1 | * | 10/2008 | Friesen .................... | A01C 7/06 111/163 |
| 2011/0030595 A1 | | 2/2011 | Cruson | |
| 2013/0000534 A1 | | 1/2013 | Schaffert | |

(Continued)

*Primary Examiner* — Thomas B Will
*Assistant Examiner* — Ian A Normile
(74) *Attorney, Agent, or Firm* — Parsons & Goltry, PLLC; Michael W. Goltry; Robert A. Parsons

(57) ABSTRACT

A soil cutting head for a mount of an agricultural implement includes a head having a leading extremity for cutting into soil ahead of the mount, and a fertilizer tube extending through the head to a discharge end for discharging a stream of fertilizer into the soil from the head.

6 Claims, 30 Drawing Sheets

(56) References Cited

U.S. PATENT DOCUMENTS

| | | | |
|---|---|---|---|
| 2013/0233215 A1* | 9/2013 | Cruson | A01C 5/062 111/119 |
| 2013/0319306 A1* | 12/2013 | Yeomans | A01B 15/025 111/152 |
| 2014/0053763 A1 | 2/2014 | Wickstrom | |

* cited by examiner

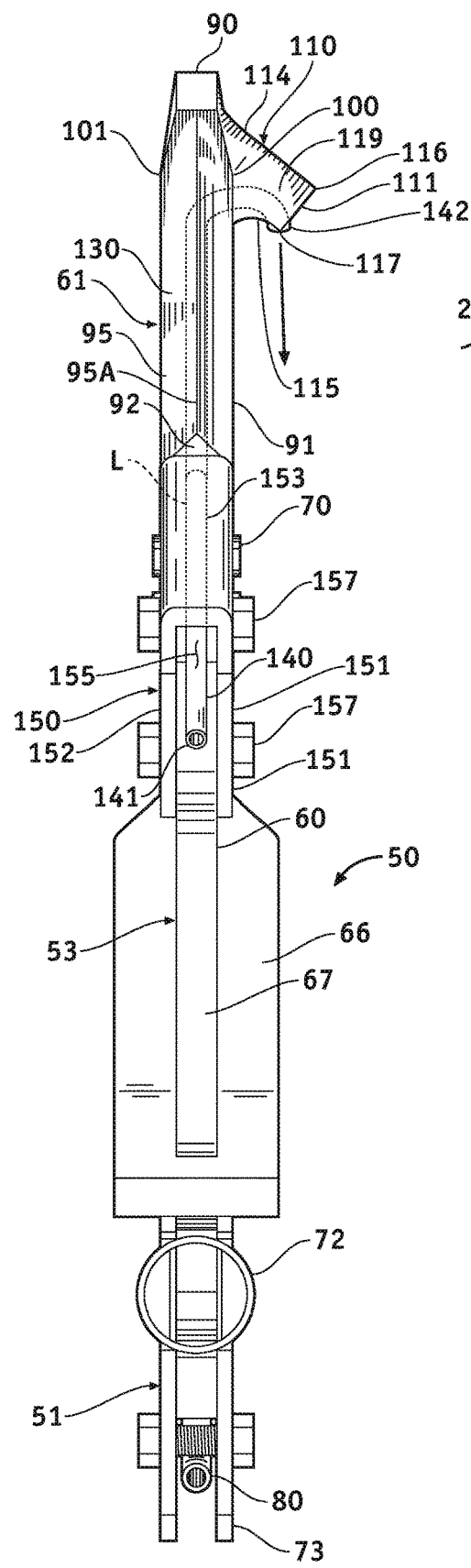
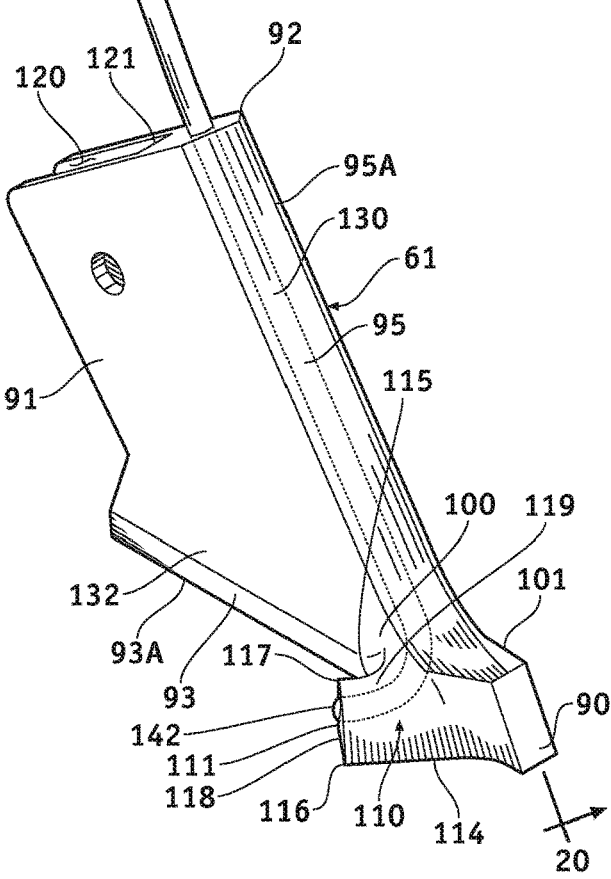
FIG. 7
FIG. 8

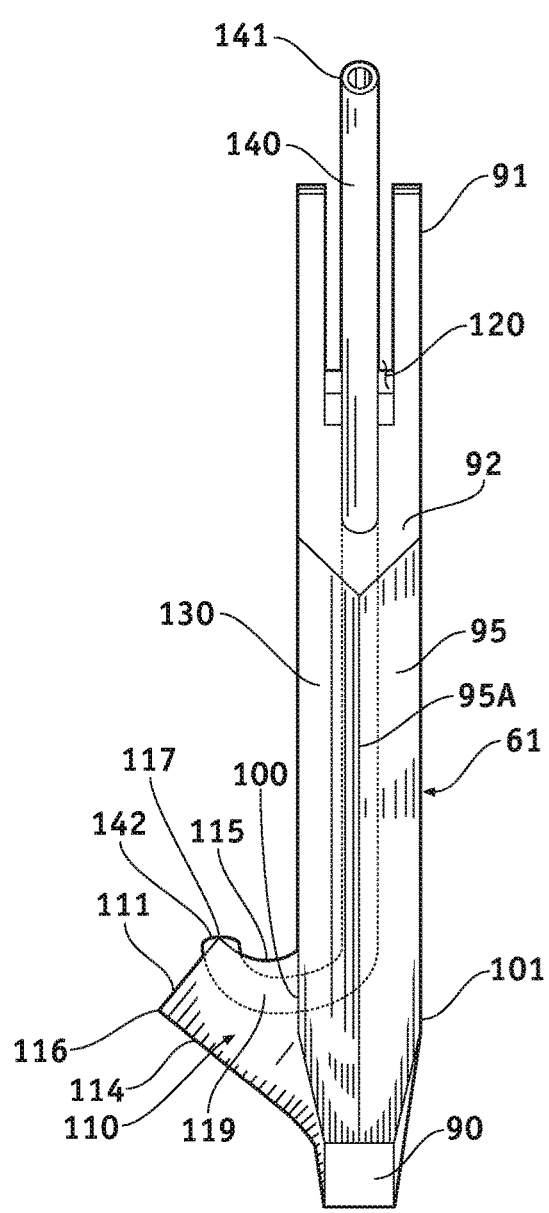
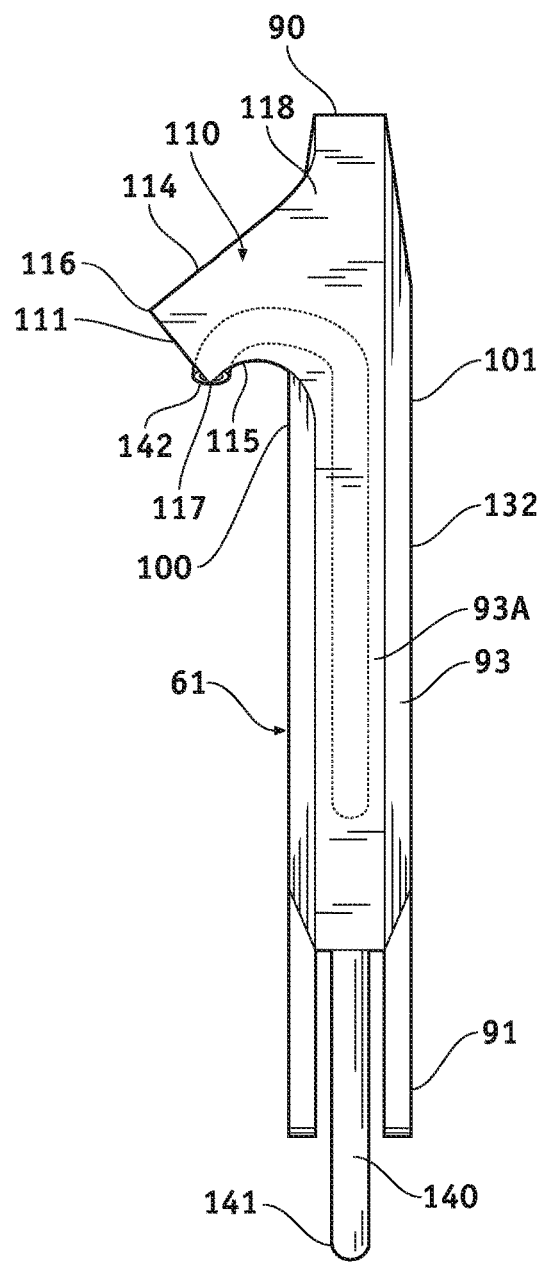
FIG. 18
FIG. 19

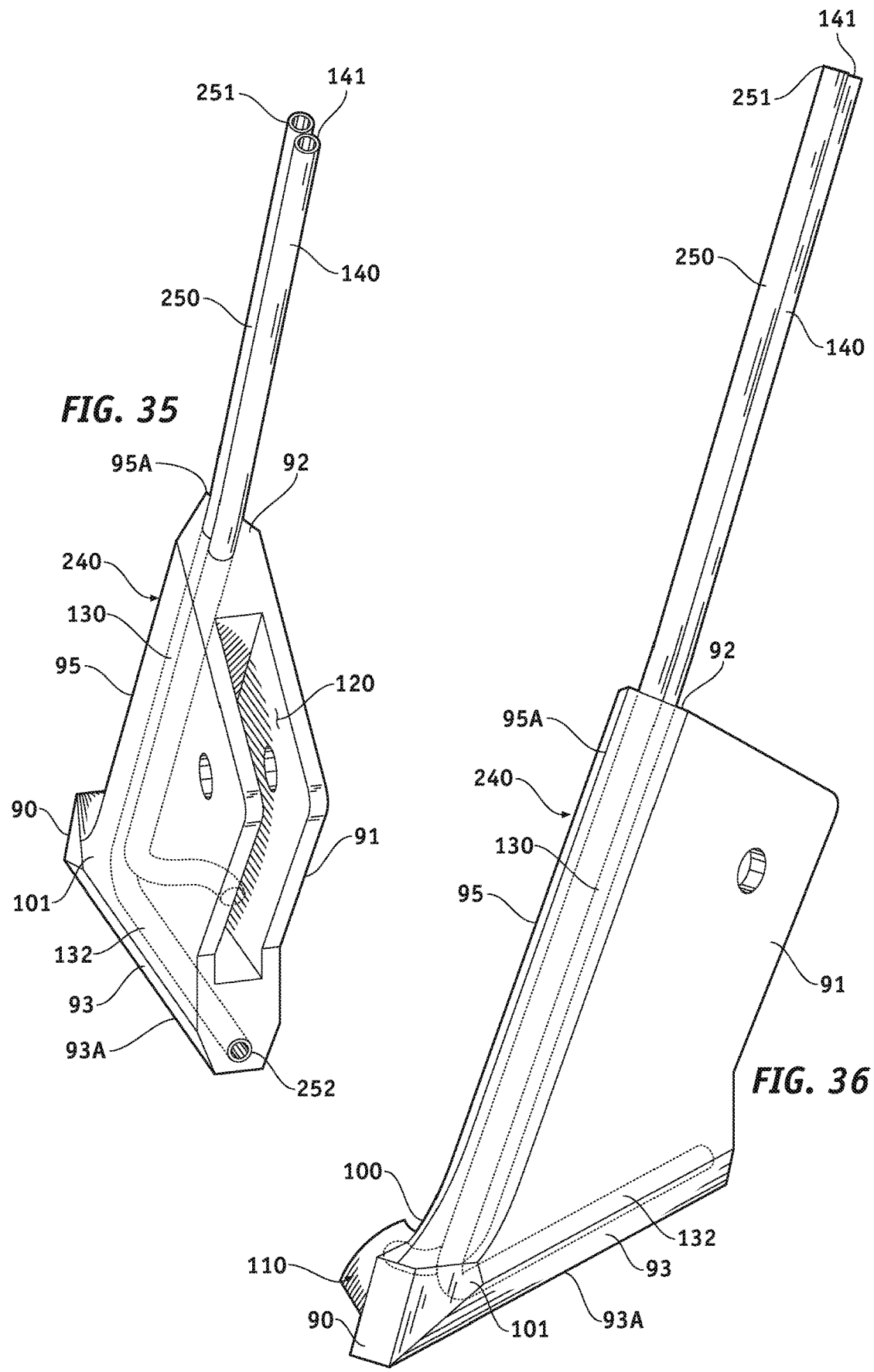

CUTTING HEADS AND AGRICULTURAL SEEDER IMPLEMENTS FORMED THEREWITH

FIELD OF THE INVENTION

The present invention relates to agricultural implements and, more particularly, to a soil opener for an agricultural seeder implement for simultaneously cutting and depositing fertilizer into soil.

BACKGROUND OF THE INVENTION

In an agricultural seeder implement, seeds are conveyed by an air stream from a hopper to a number of seeding elements, carried by a frame, that inject the seed into furrows cut into the ground by openers incorporated with the seeding elements. During the seeding process, fertilizer banding is customary, which is the concurrent application of a fertilizer adjacent to but spaced from the applied seeds so that once germination has occurred the roots can access the fertilizer. Customarily, the seed is applied to the furrow first followed by the fertilizer, which inherently results in the application of the fertilizer above the applied seeds. Until the applied fertilizer is dissolved and carried down into the soil to the planted seeds through the application of water, whether from rain or watering, the ability of the roots of the planted seeds to reach the fertilizer is inherently limited. Furthermore, conventional openers of agricultural seeder implements can fail to sufficiently disrupt and aerate the soil during furrow formation, especially when the soil is hard or compacted, which can inherently delay the ability of the roots of the germinated seeds from taking root, and slow the distribution of the fertilizer into the soil.

SUMMARY OF THE INVENTION

According to the principle of the invention, an agricultural implement for working soil across which the agricultural implement travels or is towed includes a mount, a head having a trailing extremity mounted on the mount and a leading extremity for cutting into soil ahead of the mount, and a fertilizer tube extending through the head to a discharge end for discharging a stream of fertilizer into the soil from the head. A shield is mounted on the mount above the head. The shield spans a length of the fertilizer tube above the head for protecting the length of the fertilizer tube from soil and rocks and agricultural crop material. In a first embodiment, the discharge end of the fertilizer tube is proximate to the leading extremity for discharging the stream of fertilizer from the leading extremity. The head further includes opposed upper and lower ends, and a leading bulk that extends from the upper end to the leading extremity proximate to the lower end. In the first embodiment, the fertilizer tube extends through the leading bulk from the upper end to the leading extremity. In the first embodiment, the leading extremity includes opposed first and second sides and a knife extending outwardly from one of the first and second sides, and the fertilizer tube extends through the knife to the discharge opening for discharging the stream of fertilizer into the soil from the knife. The knife is swept back from the leading extremity. In a second embodiment, the discharge end of the fertilizer tube is proximate to the trailing extremity for discharging the stream of fertilizer from the trailing extremity. In the second embodiment, the head further includes a trailing bulk that extends along the lower end of the head from the leading extremity to the trailing extremity, and the fertilizer tube extends through the leading bulk from the upper end to the leading extremity and through the lower bulk from the leading extremity to the trailing extremity.

According to the principle of the invention, an agricultural implement for working soil across which the agricultural implement travels or is towed includes a mount, a head having a trailing extremity mounted on the mount and a leading extremity including opposed first and second sides, the leading extremity for cutting into soil ahead of the mount, a first fertilizer tube extending through the head to a first discharge end for discharging a first stream of fertilizer into the soil from the head relative to the first side of the leading extremity, and a second fertilizer tube extending through the head to a second discharge end for discharging a second stream of fertilizer into the soil from the head relative to the second side of the leading extremity. The head further includes opposed upper and lower ends, and a leading bulk extending from the upper end to the leading extremity proximate to the lower end. The first and second fertilizer tubes extend through the leading bulk from the upper end to the leading extremity. A shield mounted on the mount above the upper end of the head spans lengths of the respective first and second fertilizer tubes above the upper end of the head for protecting the lengths of the respective first and second fertilizer tubes from soil and rocks and agricultural crop material.

According to the principle of the invention, an agricultural implement for working soil across which the agricultural implement travels or is towed includes a mount, a head having a trailing extremity mounted on the mount and a leading extremity including opposed first and second sides, a first knife extending outwardly from the first side of the leading extremity, and a second knife extending outwardly from the second side of the leading extremity, the leading extremity for cutting into soil ahead of the mount, a first fertilizer tube extending through the head to a first discharge end at the first knife for discharging a first stream of fertilizer into the soil from the first knife, and a second fertilizer tube extending through the head to a second discharge end at the second knife for discharging a second stream of fertilizer into the soil from the second knife. The first and second knives are swept back from the leading extremity. The head further includes opposed upper and lower ends, a leading bulk that extends from the upper end to the leading extremity proximate to the lower end, and the first and second fertilizer tubes extend through the leading bulk from the upper end to the respective first and second knives of the leading extremity. A shield mounted on the mount above the upper end of the head spans lengths of the respective first and second fertilizer tubes above the upper end of the head for protecting the lengths of the respective first and second fertilizer tubes from soil and rocks and agricultural crop material.

According to the principle of the invention, a soil cutting head for a mount of an agricultural implement includes a head having a trailing extremity configured to be mounted on the mount of the agricultural implement and a leading extremity for cutting into soil, and a fertilizer tube extending through the head to a discharge end for discharging a stream of fertilizer into the soil from the head. In a first embodiment, the discharge end of the fertilizer tube is proximate to the leading extremity for discharging the stream of fertilizer from the leading extremity. The head further includes opposed upper and lower ends, and a leading bulk that extends from the upper end to the leading extremity proximate to the lower end. In the first embodiment, the fertilizer tube extends through the leading bulk from the upper end to the leading extremity. In the first embodiment, the leading extremity includes opposed first and second sides and a knife extending outwardly from one of the first and second sides, and the fertilizer tube extends through the knife to the discharge opening for discharging the stream of fertilizer into the soil from the knife. The knife is swept back from the leading extremity. In a second embodiment, the discharge end of the fertilizer tube is proximate to the trailing extremity for discharging the stream of fertilizer from the trailing extremity. The head further includes a lower bulk that extends along the lower end of the head from the leading extremity to the trailing extremity. In the second embodiment, the fertilizer tube extends through the leading bulk from the upper end to the leading extremity and through the lower bulk from the leading extremity to the trailing extremity.

According to the principle of the invention, a soil cutting head for a mount of an agricultural implement includes a head having a trailing extremity configured to be mounted on the mount of the agricultural implement and a leading extremity including opposed first and second sides, the leading extremity for cutting into soil, a first fertilizer tube extending through the head to a first discharge end for discharging a first stream of fertilizer into the soil from the head relative to the first side of the leading extremity, and a second fertilizer tube extending through the head to a second discharge end for discharging a second stream of fertilizer into the soil from the head relative to the second side of the leading extremity. The head further includes opposed upper and lower ends, a leading bulk that extends from the upper end to the leading extremity proximate to the lower end, and the first and second fertilizer tubes extend through the leading bulk from the upper end to the leading extremity.

According to the principle of the invention, a soil cutting head for a mount of an agricultural implement includes a head having a trailing extremity configured to be mounted on the mount of the agricultural implement and a leading extremity including opposed first and second sides, a first knife extending outwardly from the first side of the leading extremity, and a second knife extending outwardly from the second side of the leading extremity, the leading extremity for cutting into soil, a first fertilizer tube extending through the head to a first discharge end at the first knife for discharging a first stream of fertilizer into the soil from the first knife, and a second fertilizer tube extending through the head to a second discharge end at the second knife for discharging a second stream of fertilizer into the soil from the second knife. The first and second knives are swept back from the leading extremity. The head further includes opposed upper and lower ends, a leading bulk that extends from the upper end to the leading extremity proximate to the lower end, and the first and second fertilizer tubes extend through the leading bulk from the upper end to the respective first and second knives of the leading extremity.

BRIEF DESCRIPTION OF THE DRAWINGS

Referring to the drawings:

FIG. 7 is a top plan view of the embodiment of FIG. 1, the portions of the fertilizer tube extending through the shield and the head being depicted in phantom line;

FIG. 8 is a top front right side perspective view of the head first illustrated in FIG. 1, the portion of the fertilizer tube extending through the head being depicted in phantom line;

FIG. 18 is a top plan view of the embodiment of FIG. 8, the portion of the fertilizer tube extending through the head being depicted in phantom line;

FIG. 19 is a bottom plan view of the embodiment of FIG. 8, the portion of the fertilizer tube extending through the head being depicted in phantom line;

FIG. 35 is a fragmented side elevation view of yet another embodiment of an agricultural implement for working soil across which the agricultural implement travels or is towed, the agricultural implement includes a mount having a leading end, a head having a trailing extremity mounted on the leading end of the mount and a leading extremity for cutting into soil ahead of the mount, a first fertilizer tube extending through the head to a first discharge end at the leading extremity of the head for discharging a stream of fertilizer into the soil from the leading extremity of the head, a second fertilizer tube extending through the head to a second discharge end at the trailing extremity of the head for discharging a stream of fertilizer into the soil from the trailing extremity of the head, and a shield mounted on the mount above the head that spans lengths of the respective first and second fertilizer tubes above the head for protecting the lengths of the respective first and second fertilizer tubes from soil and rocks and agricultural crop material, the lengths of the first and second fertilizer tubes extending through the shield and the head being depicted in phantom line;

FIG. 36 is a top front left side perspective view of the head of the embodiment of FIG. 35, the portions of the first and second fertilizer tubes extending through the head being depicted in phantom line.

DETAILED DESCRIPTION

Figure 1:
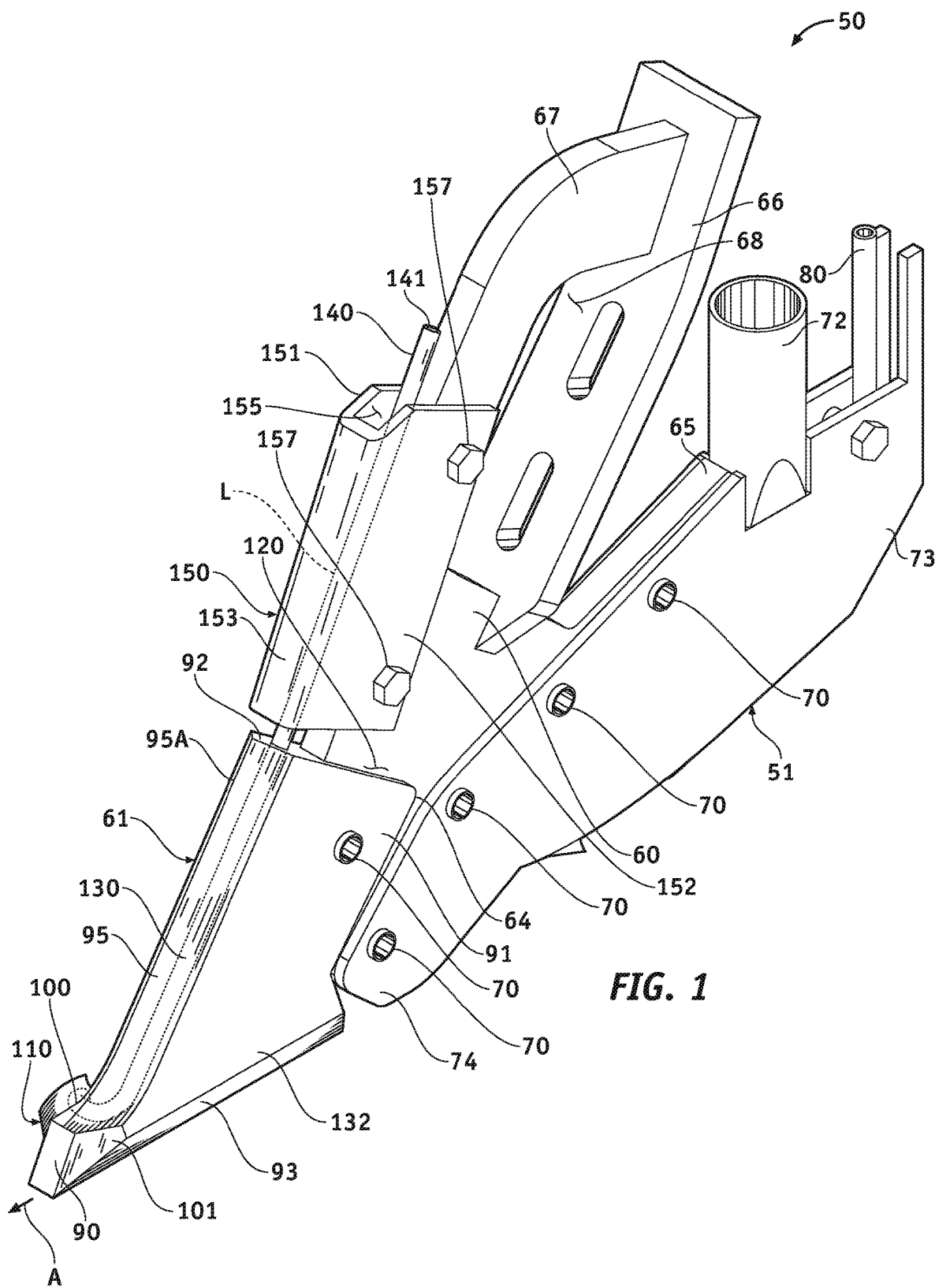
FIG. 1 is a top front perspective view of an agricultural implement for working soil across which the agricultural implement travels or is towed, the agricultural implement includes a mount having a leading end, a head having a trailing extremity mounted on the leading end of the mount and a leading extremity for cutting into soil ahead of the mount, a fertilizer tube extending through the head to a discharge end at the leading extremity of the head for discharging a stream of fertilizer into the soil from the leading extremity of the head, and a shield mounted on the mount above the head that spans a length of the fertilizer tube above the upper end of the head for protecting the length of the fertilizer tube from soil and rocks and agricultural crop material, the length of the fertilizer tube extending through the shield being depicted in phantom line.
Figure 2:
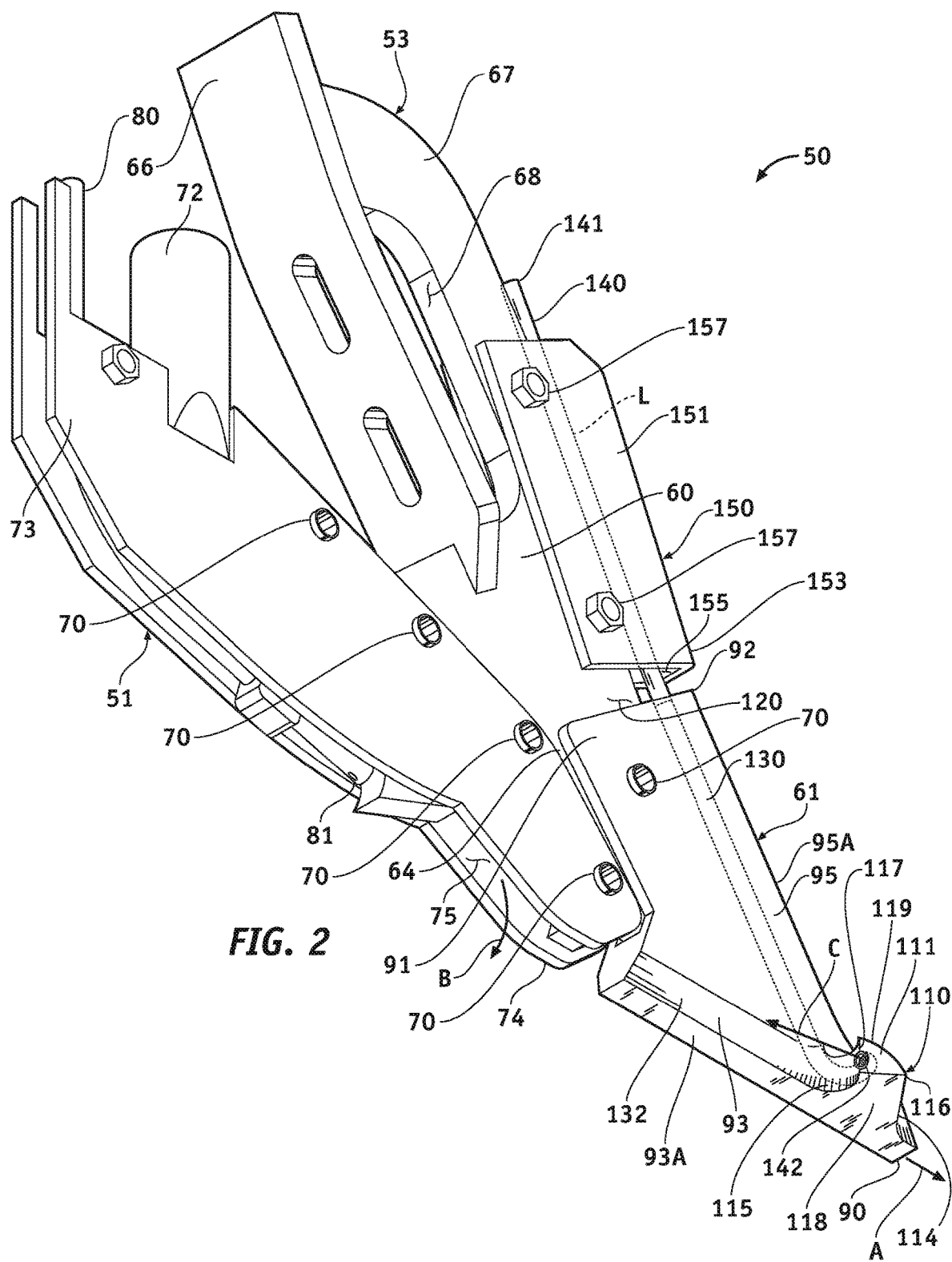
FIG. 2 is a bottom rear perspective view of the embodiment of FIG. 1, portions of the fertilizer tube extending through the shield and the head being depicted in phantom line.
Figure 3:
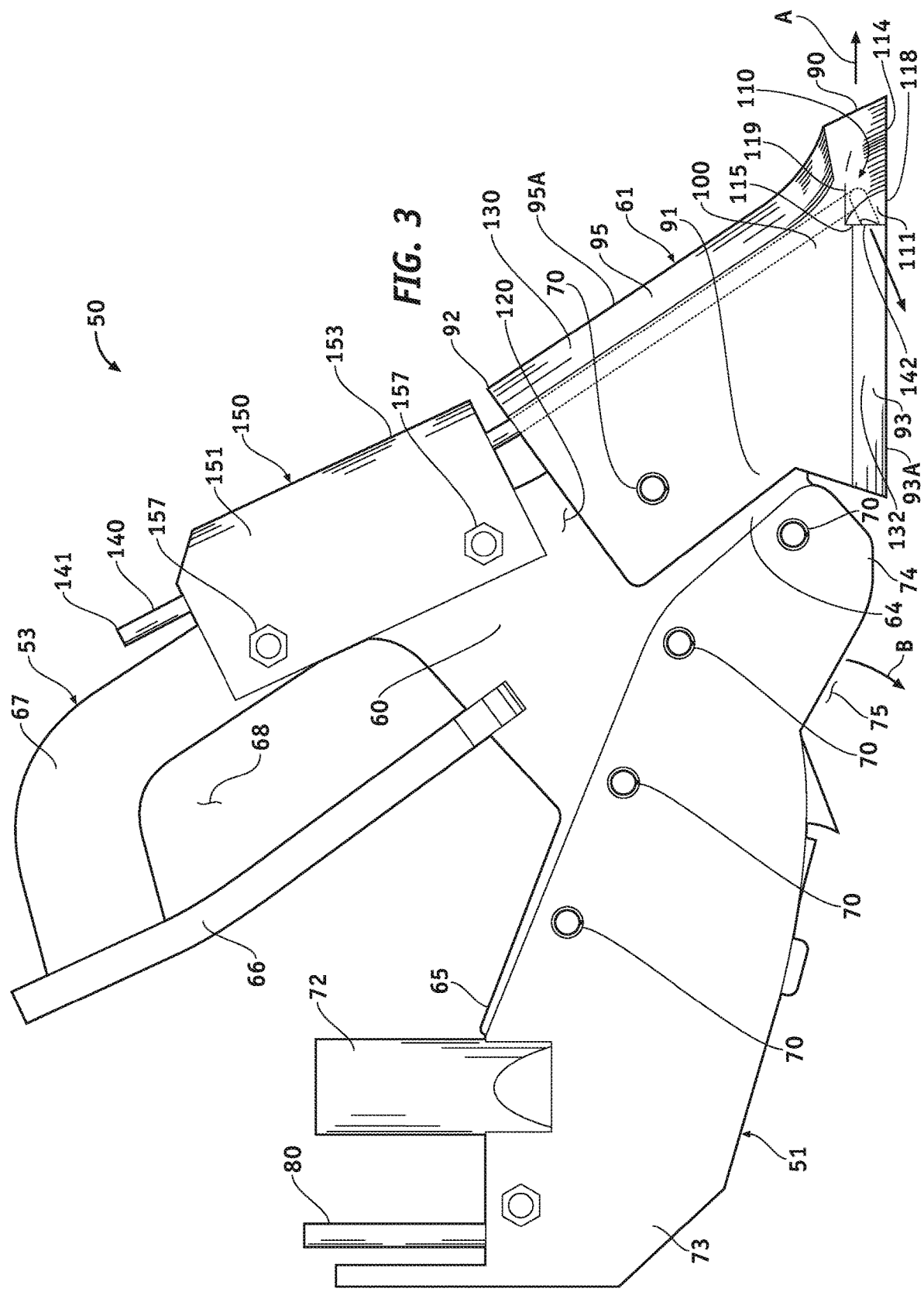
FIG. 3 is a right side elevation view of the embodiment of FIG. 1, the portion of the fertilizer tube extending through the head being depicted in phantom line.
Figure 4:
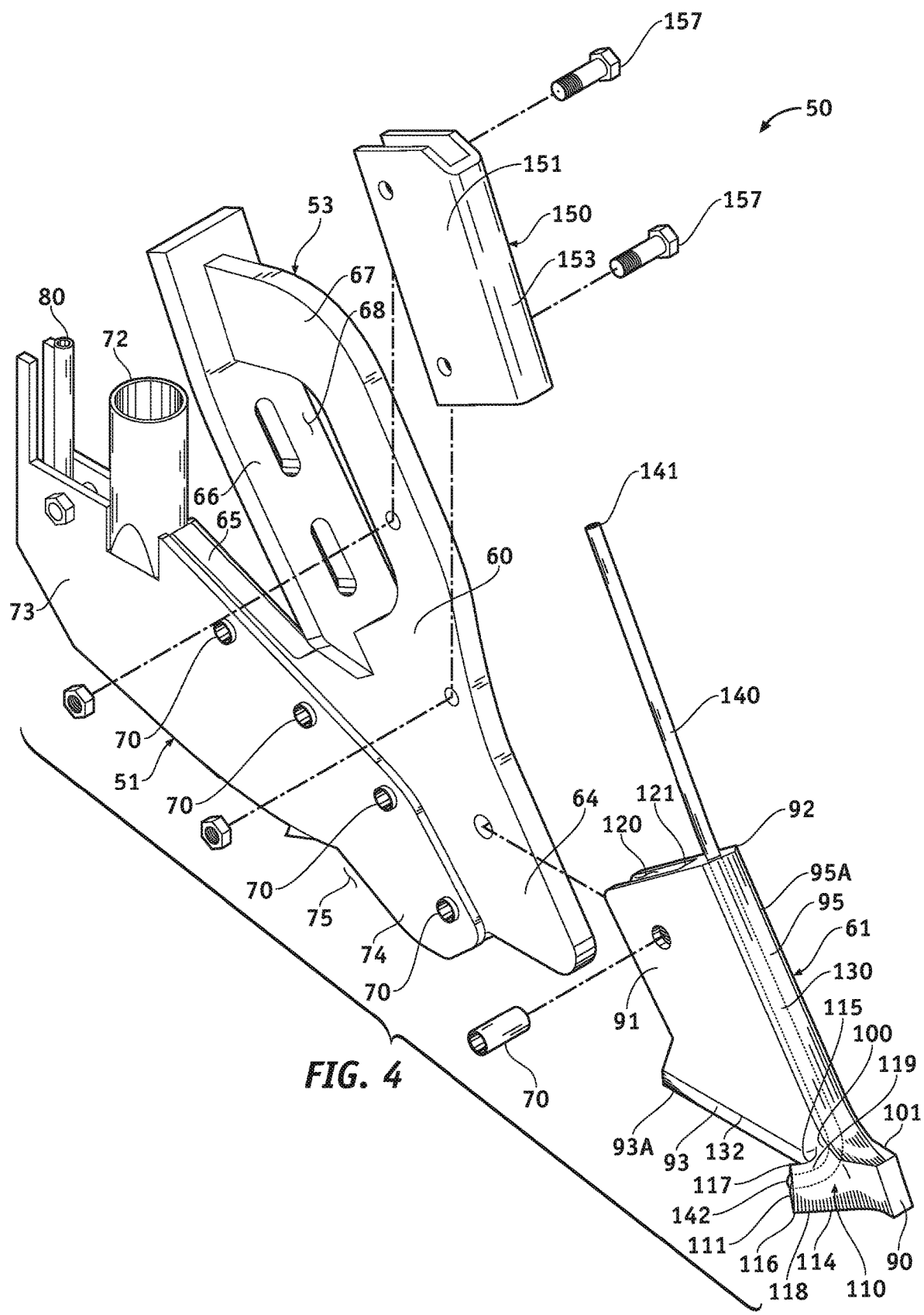
FIG. 4 is partially exploded perspective view of the embodiment of FIG. 1, the portion of the fertilizer tube extending through the head being depicted in phantom line.
Figure 5:
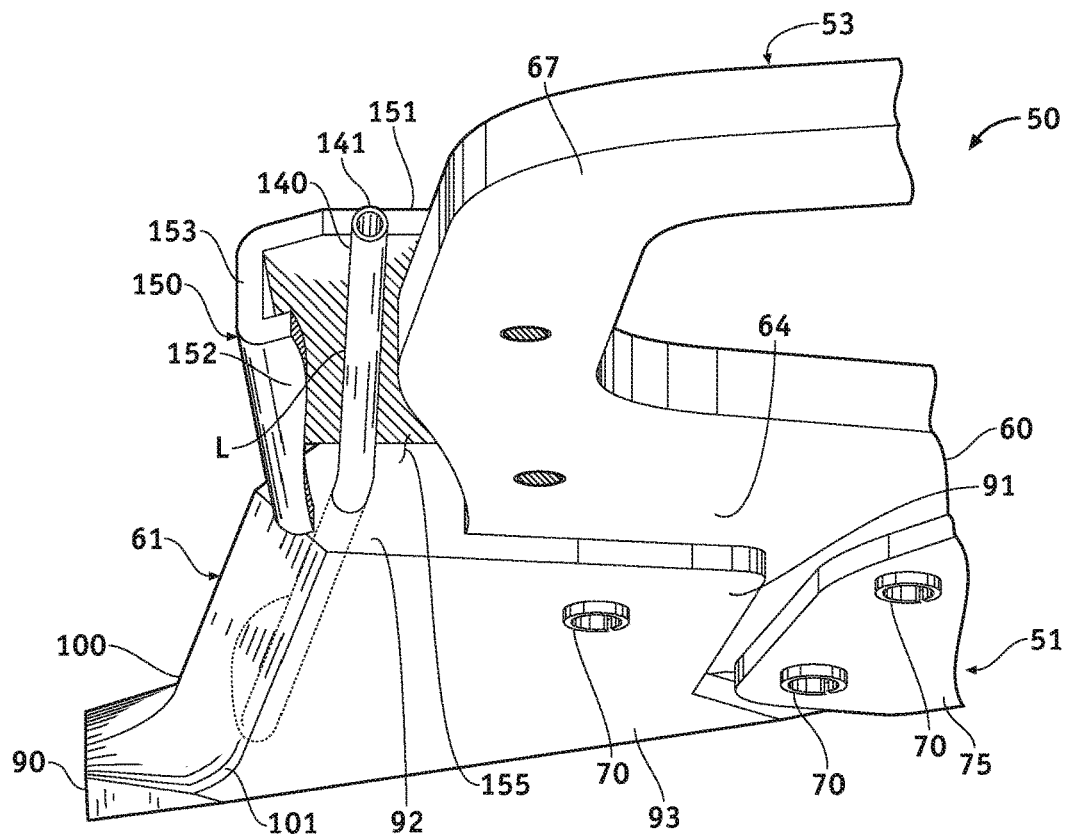
FIGS. 5 and 6 are fragmentary top perspective views illustrating the length of the fertilizer tube extending through the shield.
Figure 6:
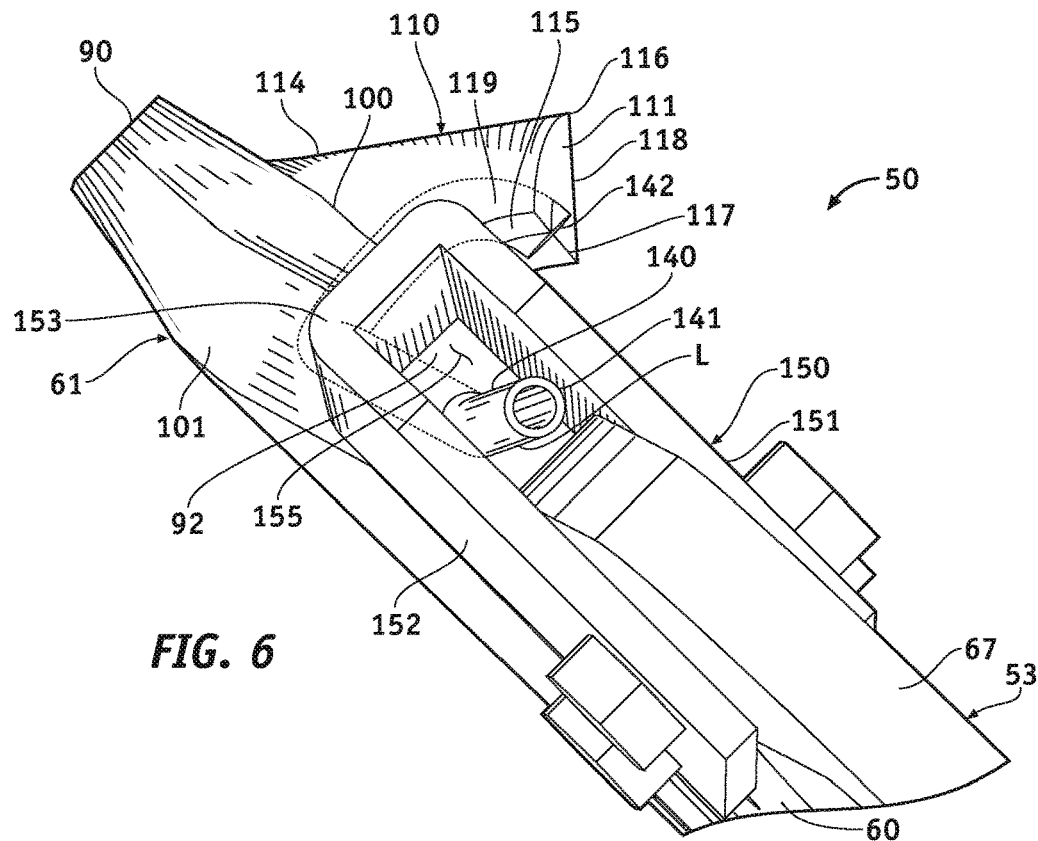
Figure 9:
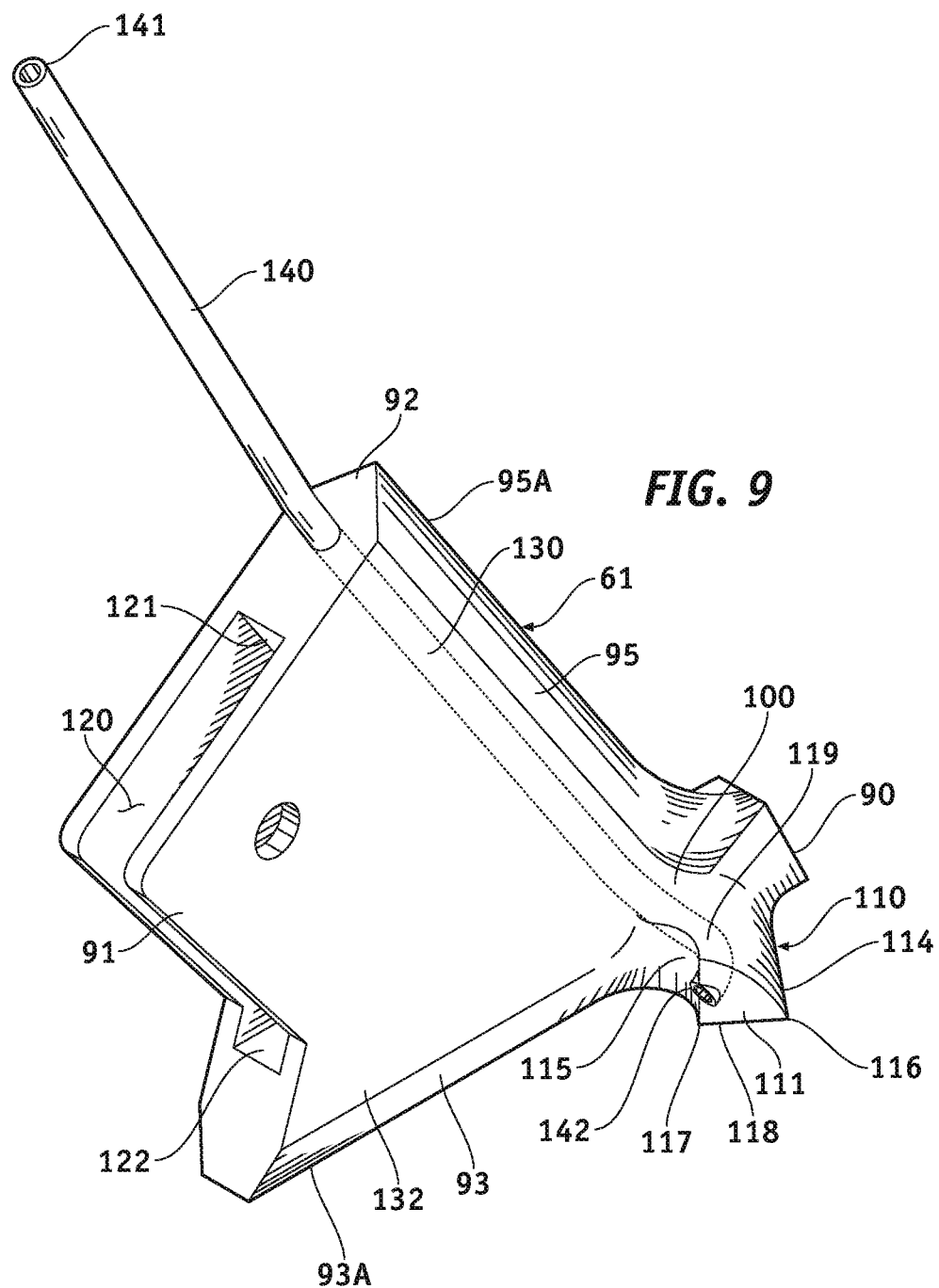
FIG. 9 is a top rear right side perspective view of the embodiment of FIG. 8, the portion of the fertilizer tube extending through the head being depicted in phantom line.
Figure 10:
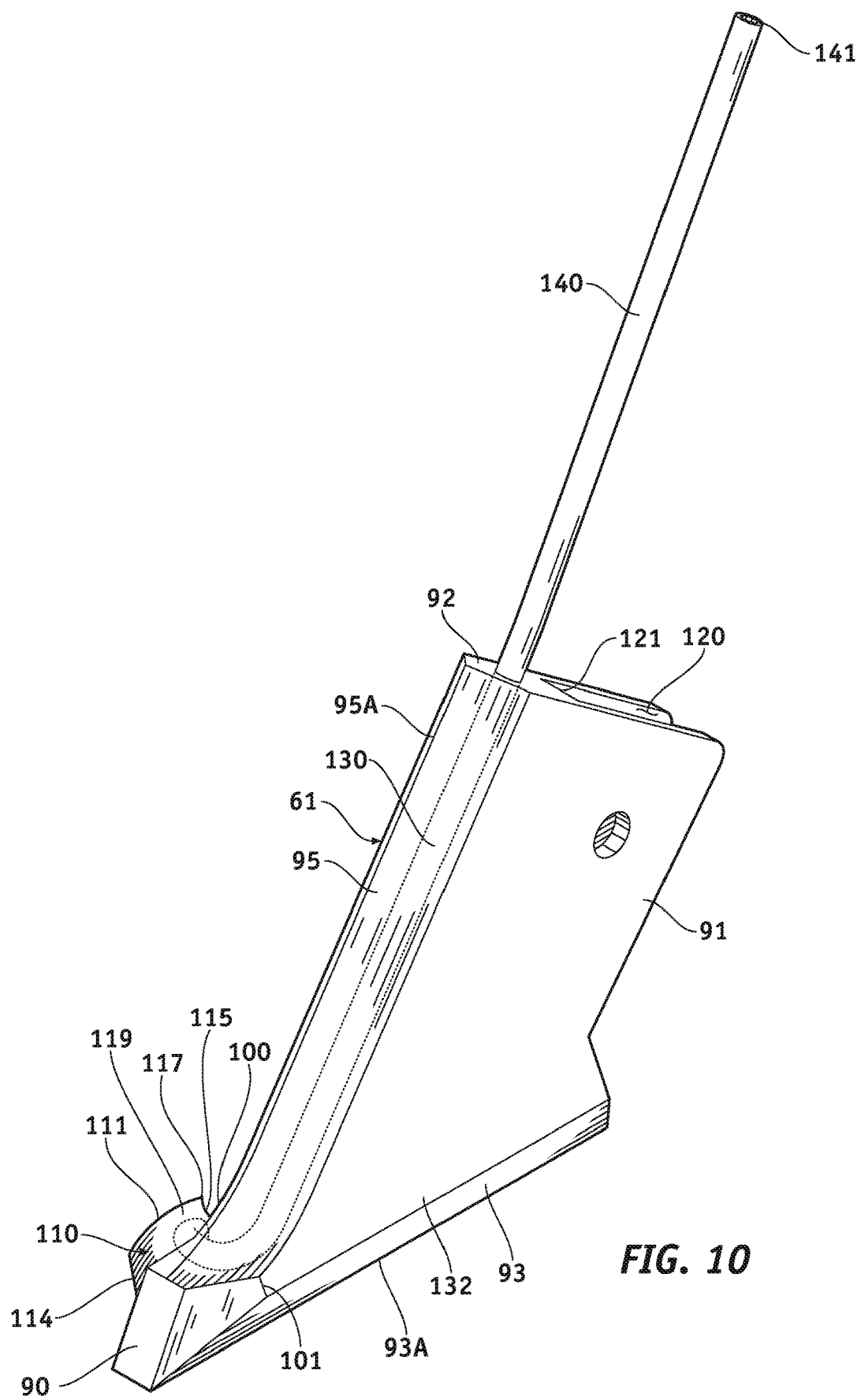
FIG. 10 is a top front left side perspective view of the embodiment of FIG. 8, the portion of the fertilizer tube extending through the head being depicted in phantom line.
Figure 11:
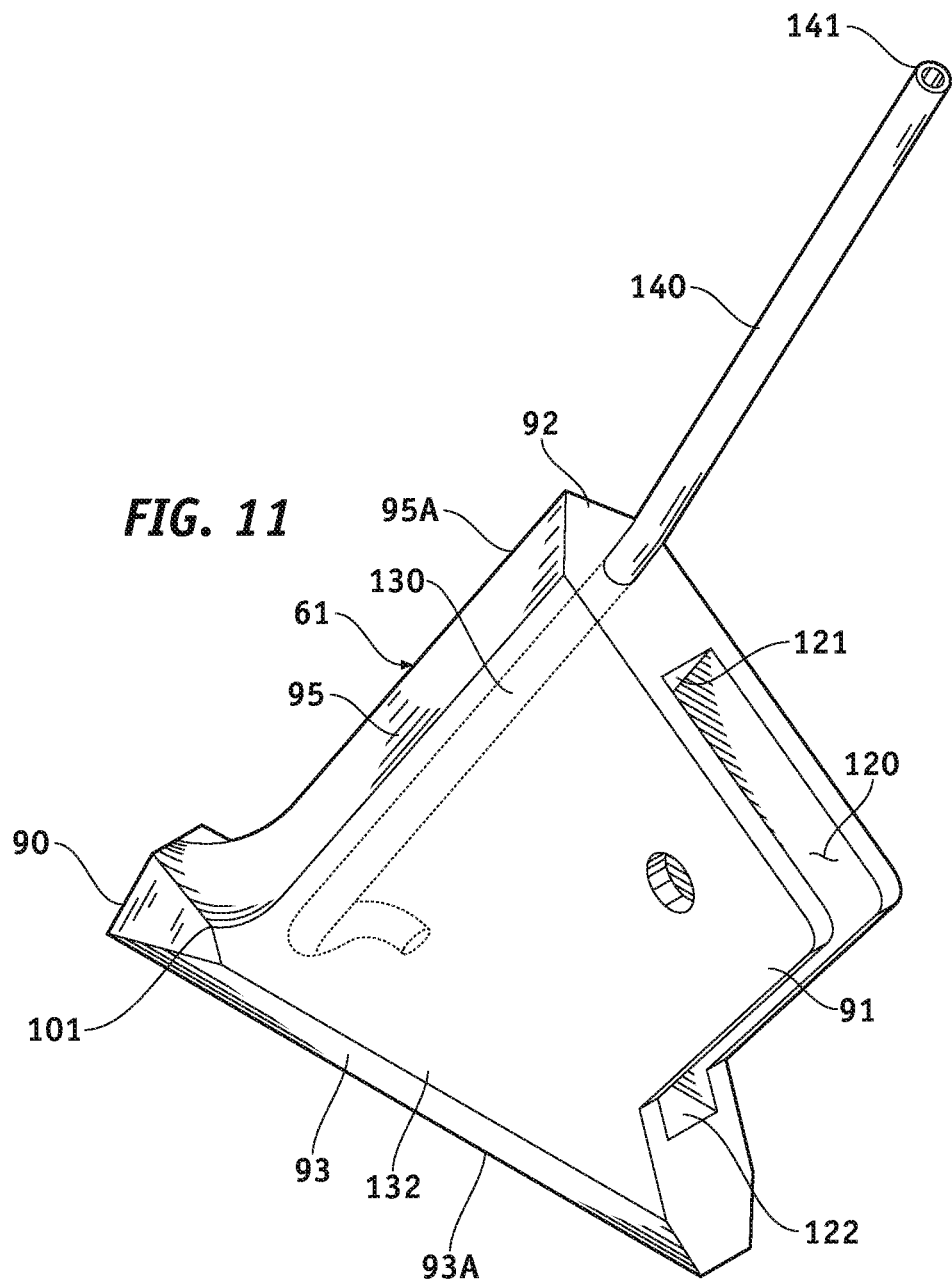
FIG. 11 is a top rear left side perspective view of the embodiment of FIG. 8, the portion of the fertilizer tube extending through the head being depicted in phantom line.
Figure 12:
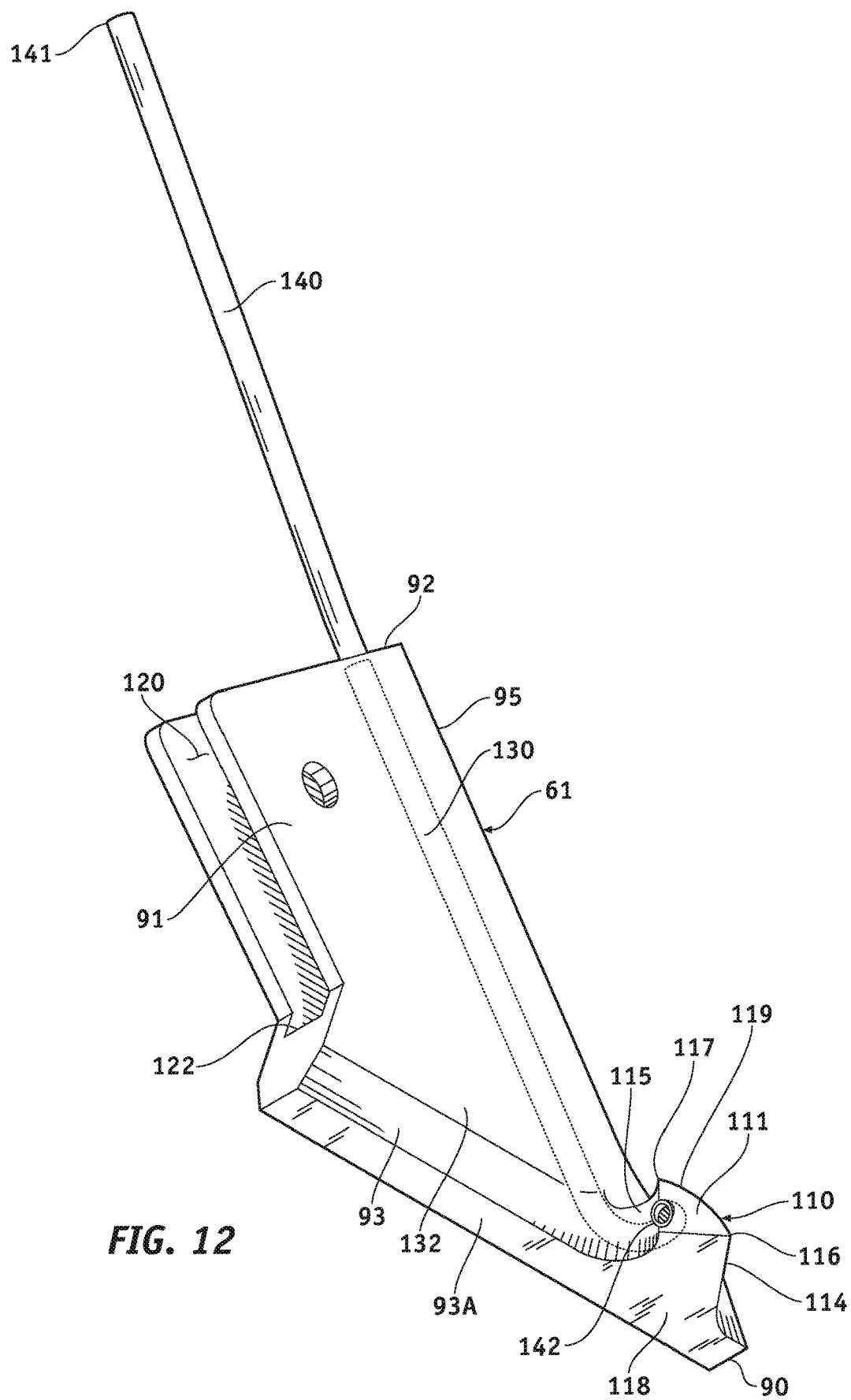
FIG. 12 is a bottom rear right side perspective view of the embodiment of FIG. 8, the portion of the fertilizer tube extending through the head being depicted in phantom line.
Figure 13:
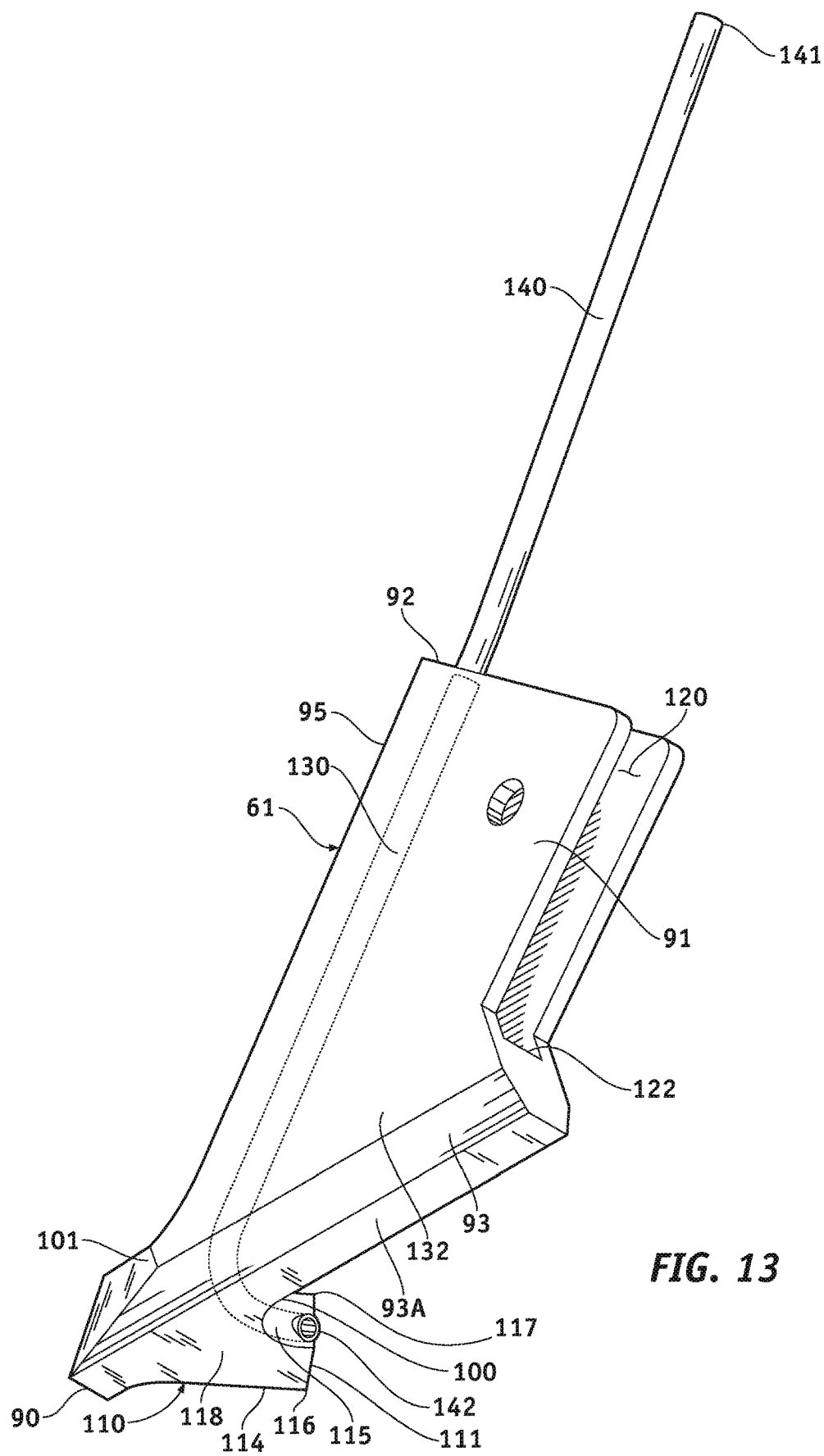
FIG. 13 is a bottom rear left side perspective view of the embodiment of FIG. 8, the portion of the fertilizer tube extending through the head being depicted in phantom line.
Figure 14:
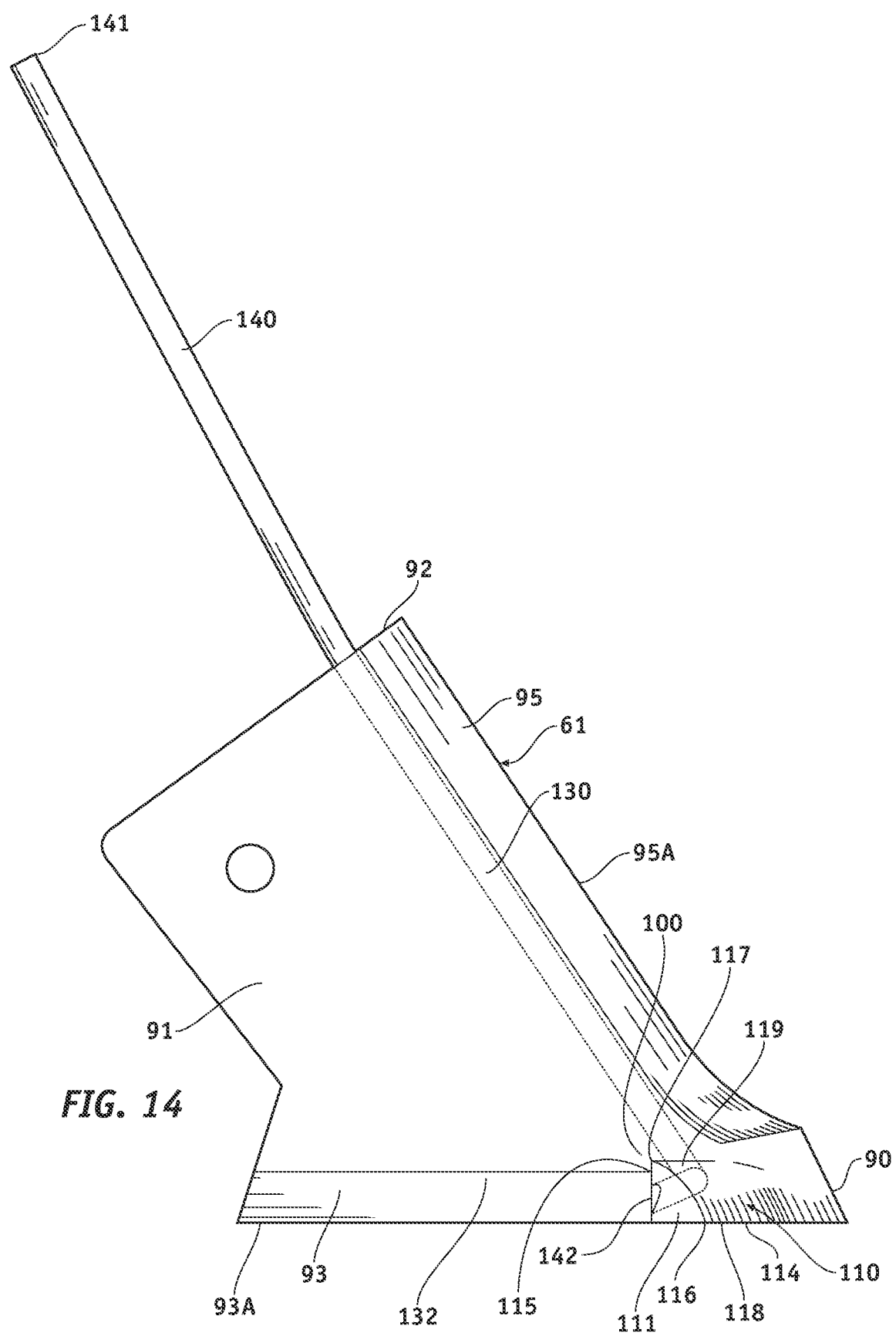
FIG. 14 is a right side elevation view of the embodiment of FIG. 8, the portion of the fertilizer tube extending through the head being depicted in phantom line.
Figure 15:
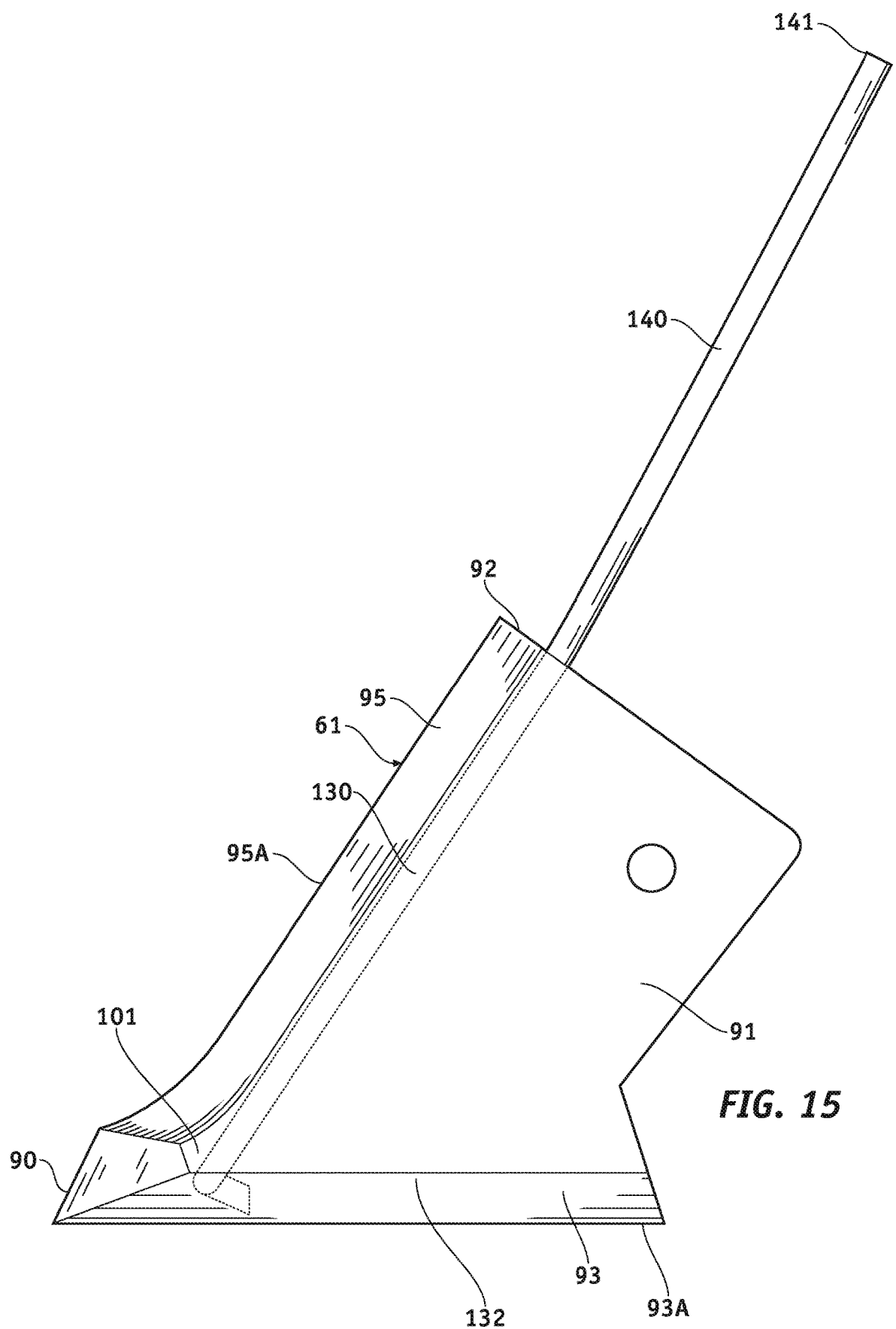
FIG. 15 is a left side elevation view of the embodiment of FIG. 8, the portion of the fertilizer tube extending through the head being depicted in phantom line.
Figure 16:
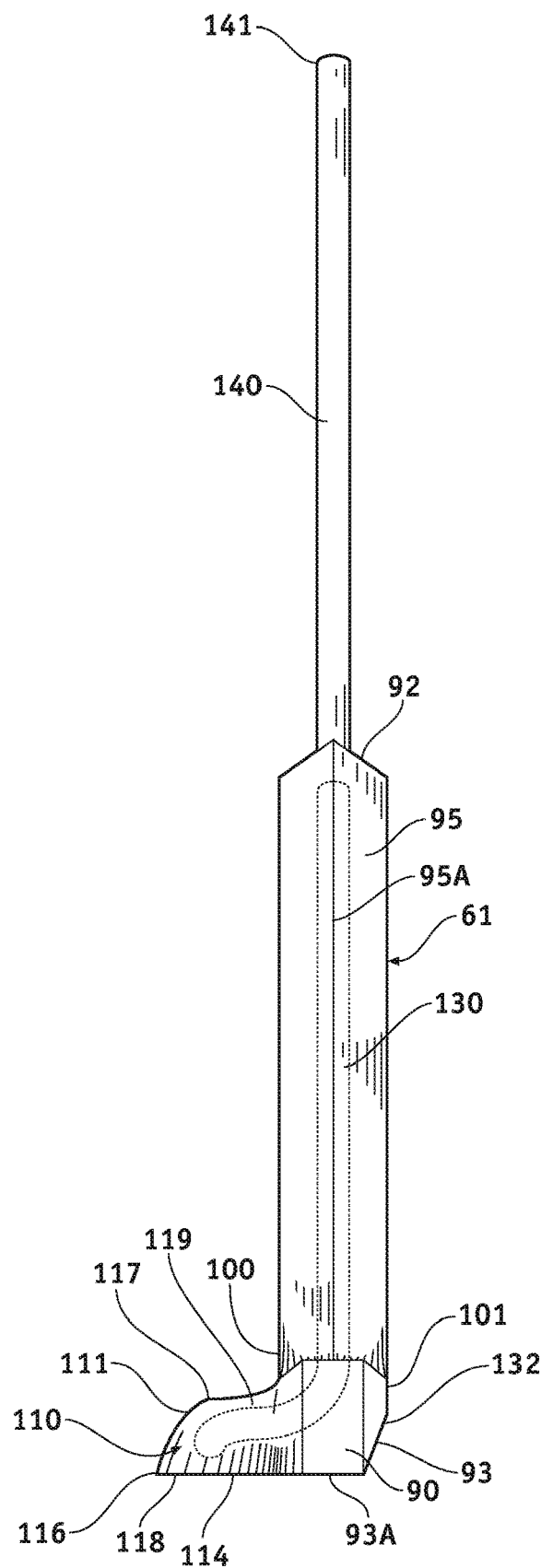
FIG. 16 is a front elevation view of the embodiment of FIG. 8, the portion of the fertilizer tube extending through the head being depicted in phantom line.

Turning now to the drawings, in which like reference characters indicate corresponding elements throughout the several views, attention is first directed to FIGS. 1, 2, and 7 in which there is seen an agricultural seeder implement 50 constructed and arranged in accordance with the principle of the invention. Implement 50 includes seed boot 51 and opener 53. Opener 53 is connected to seed boot 51. Opener 53 is configured to be connected to a shank of a plow frame for suspending implement 50 from the shank, which, when advanced in the direction of arrowed line A leading with opener 53, enables implement 50 to work the soil for sowing a crop. Opener 53 is a chisel, being a non-moving and non-rotating opener for being advanced by a tractor for cutting a furrow in the ground at a chosen depth from the surface of the ground, and seed boot 51 connected to opener 53 is for receiving a stream of air-driven seed and depositing the stream of air-driven seed into the furrow formed by opener 53. Opener 53 is an assembly of mount 60 and head 61.

Referring to FIGS. 1-4 in relevant part, mount 60 is stout, strong, robust, and of substantial construction being formed of steel or other metal having inherently strong, impact resistant, and resilient material characteristics. Plate 60 includes leading end or extremity 64, trailing end or extremity 65, upright bracket 66, and upright handle 67. Bracket 66 is between trailing end 65 and handle 67, and handle 67 is between bracket 66 and leading end 64. Head 61 is connected to leading end 64 of mount 60, and seed boot 51 is connected to trailing end 65 of mount behind or otherwise to the rear of head 61. Bracket 66 is configured to be connected removably to the shank of the plow frame by suitable nut-and-bolt fasteners that extend through appropriate holes therein. Bracket 66 and handle 67 encircle opening 68 that provides clearance for facilitating the bolting of bracket 66 to the shank of the plow frame.

Seed boot 51 is stout, strong, robust, and of substantial construction being formed of steel or other metal having inherently strong, impact resistant, and resilient material characteristics. Seed boot 51 trails or is otherwise behind head 61 and is in-line with head 61, and is connected removably to mount 60 with spring pins 70 that extend through appropriate holes therein. Spring pins 70 act as self-retaining fasteners releasably or otherwise removably connecting seed boot 51 to mount 60. An upright conduit 72 proximate to rear end of seed boot 51 is for guiding a stream of air-driven seed into seed boot 51, which conveys the stream of air-driven seed forwardly toward forward end 74 of seed boot 51 to outlet 75 of seed boot 51 behind head 61 as shown in FIG. 2 through which the seeds are ejected into the furrow behind head 61. In this example, a fertilizer tube 80 is connected to rear end 73 of seed boot 51, and extends forwardly along the underside of seed boot 51 in FIG. 2 toward forward end 74 to an outlet 81 behind or otherwise to the rear of outlet 75. A chosen fertilizer is continuously conveyed from a fertilizer hopper to fertilizer tube 80, and fertilizer tube 80 is for conveying the fertilizer therethrough for deposition downwardly into the furrow through outlet 81 to the rear of outlet 75 through which the seeds are deposited into the furrow.

Referring in relevant part to FIGS. 8-20, head 61 is a cutting head, a stout, strong, robust, body made of cast iron in this example or other selected metal material having inherently strong, impact resistant, and resilient material characteristics, and is configured to be mounted on leading end 64 of mount 60 in FIGS. 1-6. Head 61 has leading extremity 90, which is a wedge-like cutting extremity for cutting into the ground or planting surface, namely, the soil into which seeds are to be planted, an opposite trailing extremity 91 configured to be connected to leading extremity 64 of mount 60 of opener 53, upper end 92 and an opposite lower end 93, and forward end 95 that extends downwardly and forwardly from upper end 92 toward lower end 93 to leading extremity 90. Forward end 95 has a leading edge 95A that extends downwardly and forwardly from upper end 92 to leading extremity 90 for cutting into the soil. Forward end 95 and leading edge 95A of head 61 concurrently incline downwardly from upper end 92 to leading extremity 90. Lower end 93 has lower surface 93A. Lower end 93 and lower surface 93A are horizontal and extend from trailing extremity 91 to leading extremity 90.

Figure 17:
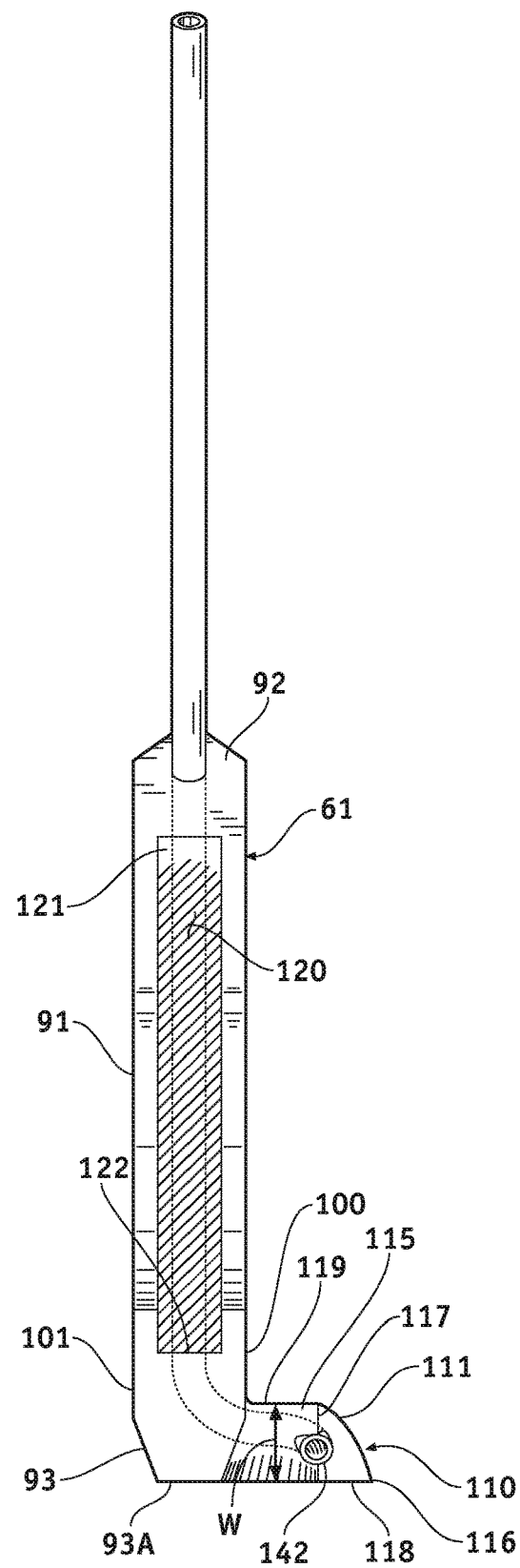
FIG. 17 is a rear elevation view of the embodiment of FIG. 8, the portion of the fertilizer tube extending through the head being depicted in phantom line.

Leading extremity 90 includes opposed sides 100 and 101, and knife 110. Knife 110, a wedge-like body, extends laterally outward from side 100 to distal end 111, which is flat. Knife 110 has a leading edge 114, which is a soil cutting edge that extends from side 100 to outermost corner 116 of distal end 111, and a trailing end 115 that extends from side 100 to intermediate corner 117 of distal end 111. Knife 110 enlarges from leading edge 114 to trailing end 115 along the length of knife 110 from side 100 to distal end 111. Knife 110 is swept back from leading extremity 90 to distal end 111, and distal end 111 faces outwardly from side 100 and is angled rearwardly from leading extremity 90. Distal end 111 intersects leading edge 114 at outermost corner 116 of knife 110, and distal end 111 intersects trailing end 115 at intermediate corner 117 of knife 110. Intermediate corner 117 of knife 110 is between outermost corner 116 and side 100. As best seen in FIG. 17, trailing end 115 has an upright width W that extends from lower end 118 of knife 110 to upper end 119 of knife 110. Intermediate corner 117 forms a part of distal end 111 and extends from lower end 118 of knife 110 to upper end 119 of knife 110. Lower end 118 of knife 110, which is flat, extends forwardly and horizontally from trailing end 115 to leading edge 114, and upper end 119 of knife 110 extends forwardly and inclines downwardly to leading edge 114.

Figure 20:
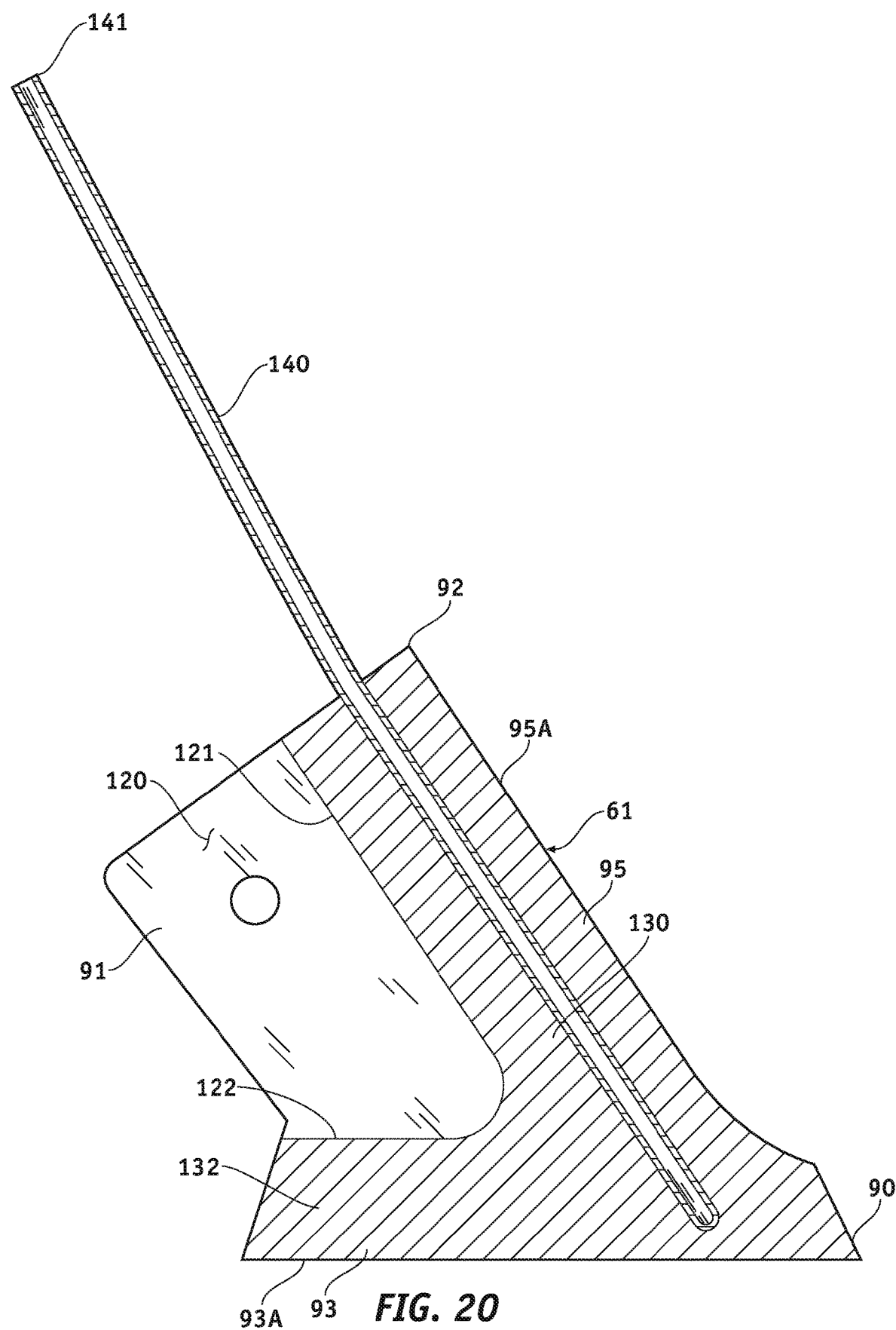
FIG. 20 is a section view taken along line 20-20 of FIG. 8.

Slot 120 extends into head 61 through upper end 92 from trailing extremity 91 to a leading end of slot 120 inboard of forward end 95 and through trailing extremity 91 from upper end 92 to a lower end of slot 120 inboard of lower end 93. In FIG. 20, the leading end of slot 120 in head 61 is defined by forward end surface 121, and the lower end of slot 120 in head 61 is defined by lower end surface 122. Forward end surface 121 is an inner surface proximate to the forward end of head 61, is parallel relative to leading edge 95A, and extends downwardly from upper end 92 to lower end surface 122 proximate to leading extremity 90 proximate to lower end 93. Forward end surface 121 inclines downwardly from upper end 92 to proximate to leading extremity 90 concurrent with leading edge 95A. Lower end surface 122 is an inner surface, is parallel relative to lower end 93, and extends horizontally from trailing extremity 91 to forward end surface 121 proximate to leading extremity 90.

In FIG. 20, head 61 further includes a leading bulk 130 and a lower bulk 132. Leading bulk 130, a thickness of the substance of the material of head 61, extends upright along forward end 95 of head 61 from upper end 92 to leading extremity 90 between forward end surface 121 and leading edge 95A and between the opposed sides of head 61. Lower bulk 132, a thickness of the substance of the material of head 61, extends horizontally along the lower end 93 of head 61 from trailing extremity 91 to leading extremity 90 between lower end surface 122 and lower surface 93A and between the opposed sides of head 61.

With continuing reference in relevant part to FIGS. 8-20, head 61 further includes fertilizer tube 140. Fertilizer tube 140 is elongate and includes inlet 141 for being connected to a source of a fertilizer, and an outlet 142. Fertilizer tube 140 extends from inlet 141 and through head 61 to outlet 142. Fertilizer tube 140 is for guiding a stream of fertilizer from inlet 141 and through head 61 to outlet 142 for discharging the stream of fertilizer into the soil from head 61. The material of head 61 is molded around fertilizer tube 140.

Outlet 142 of fertilizer tube 140 is located at leading extremity 90 for discharging the stream of fertilizer outwardly from leading extremity 90, relative to side 100 or otherwise along side 100 of leading extremity 90. More specifically, outlet 142 is located at knife 110 for discharging the stream of fertilizer outwardly from knife 110 of leading extremity 90. Outlet 142 extends across intermediate corner 117 from trailing end 115 to distal end 111 between lower and upper ends 118 and 119 of knife 110 for discharging the stream of fertilizer outwardly relative to side 100 or otherwise along side 100 of leading extremity 90 and, more specifically, outwardly between lower and upper ends 118 and 119 of knife 110 concurrently from distal end 111 and trailing end 115 of knife 110 and from intermediate corner 117. In this embodiment, fertilizer tube 140 extends from inlet 141 and downwardly through leading bulk 130 from upper end 92 to leading extremity 90 and outturns through knife 110 from side 100 to outlet 142 at intermediate corner 117 of distal end 111 and trailing end 115.

Slot 120 is for accepting leading end 64 of mount 60. Trailing extremity 91 is connected removably to leading end 64 of mount 60 with spring pin 70 that extends through appropriate holes therein, when leading end 64 is applied to slot 120 in FIGS. 1-3 and 5. Spring pin 70 removably connecting trailing extremity 91 of head 61 to leading end 64 of mount 60 acts a as a self-retaining fastener releasably or otherwise removably connecting head 61 to leading end 64 of mount 60. Head 61 extends upright from lower end 93 to upper end 92, fertilizer tube 140 extends upright from upper end 92 ahead of handle 67, and head 61 extends rearwardly from leading extremity 90 to trailing extremity 91 proximate to forward end 74 of seed boot 51, when head 61 is connected to leading end 64 of mount 60. The described connection of head 61 to mount 60 is a non-destructive, removable and impermanent connection, which means that the connection between head 61 and mount 60 does not require the destruction of the connection, such as by cutting, in order to remove head 61 from mount 60. To remove head 61 from mount 60 need only requires withdrawing spring pin 70 and then withdrawing head 61 from leading end 64 of mount 60.

In use, implement 50 is suspended from a shank by connecting bracket 66 to the shank, and the shank is connected to a plow frame that is pulled or otherwise advanced by a tractor for pulling or otherwise advancing implement 50 in the direction of arrowed line A in FIGS. 1-3 and 7 at a chosen depth through the surface of the soil into which seeds are to be planted leading with leading extremity 90 of head 61 that cuts a furrow in the soil. Leading extremity 90 and leading edge 95A and knife 110 concurrently cut into the soil to form the furrow when implement 50 is advanced leading extremity 90 first through the soil into which seeds are to be planted. Knife 110 extends laterally outward from side 100 cuts into the soil leading edge 114 first for cutting and disrupting the soil along side 100 of leading extremity 90. The swept back configuration of knife 110 enables knife 110 to cut into the soil leading with leading edge 114 when implement 50 is advanced through the soil. The enlargement of knife 110 from leading edge 114 to trailing end 115 enables knife 110 to aggressively disrupt the soil along side 100 of leading extremity 90 for loosening the soil and forming the furrow. Seeds are conventionally conveyed by an air stream from a seed hopper to conduit 72, which conveys the stream of air-driven seeds into seed boot 51. The stream of air-driven seeds pass through seed boot 51 and downwardly into the furrow cut by head 61 through seed boot outlet 75 in the direction of arrowed line B in FIGS. 2 and 3. As implement 50 is pulled through and works the ground, the seed is continually deposited downwardly into the furrow through opening 75 of seed boot 51.

At the same time, a chosen fertilizer is continuously conveyed from a fertilizer hopper to inlet 141 of fertilizer tube 140, which conveys the fertilizer from inlet 141 and through head 61 and outwardly into the soil from head 61 through outlet 142 in the direction of arrowed line C in FIGS. 1 and 7 ahead of the seeds deposited into the furrow through outlet 75 trailing head 61. In one aspect, outlet 142 is located at leading extremity 90 for discharging the stream of fertilizer outwardly into the soil in the direction of arrowed line C from leading extremity 90 relative to side 100 or otherwise along side 100 thereof. In another aspect, outlet 142 is located at knife 110 for discharging the stream of fertilizer outwardly into the soil from knife 110 in the direction of arrowed line C outboard of side 100. In yet another aspect, outlet 142 is between lower and upper ends 118 and 119 of knife 110 and extends across intermediate corner 117 from trailing end 115 to distal 111 for discharging the stream of fertilizer outwardly into the soil outboard of side 100 in the direction of arrowed line C from proximate to distal end 111, namely, from intermediate corner 117 and from trailing end 115 and distal 111 along either side of intermediate corner 117. The direction of fertilizer deposition from outlet 142 in the direction of arrowed line C is a rearward direction from distal and trailing ends 111 and 115 of knife 110 into the soil.

The enlargement of knife 110 from leading edge 114 to trailing end 115 aggressively disrupts the soil along side 100 of leading extremity 90 for not only forming the furrow but also loosening the soil to enable the loosened soil to accept the fertilizer deposited therein from distal end 111 of knife 110. The application of the fertilizer from head 61 into the soil ahead of the seeds deposited into the furrow through opening 75 of seed boot 51 trailing or otherwise behind head 61 allows the soil to fold over the applied fertilizer ahead of the deposited seeds for inhibiting the deposited seeds from being laid directly atop the fertilizer and becoming chemically damaged as a result, which reduces seed loss and promotes seed access to the fertilizer applied from head 61 when the seeds germinate. Outlet 142 of fertilizer tube 140 is between lower and upper ends 118 and 119 at intermediate corner 117 between outermost corner 116 and side 100 of leading extremity 90 where distal and trailing ends 111 and 115 intersect, which enables knife 110 to shield outlet 142 from oncoming soil and crop material for preventing outlet 142 from becoming clogged or blocked. A chosen fertilizer is also continuously conveyed from a fertilizer hopper to fertilizer tube 80, which conveys the fertilizer therethrough to outlet 81 for application therethrough downwardly into the furrow following the seed deposition into the furrow from opening 75 of seed boot 51.

In FIGS. 1-6, implement 50 further includes a shield 150. Shield 150 is stout, strong, robust, and of substantial construction being formed of steel or other metal having inherently strong, impact resistant, and resilient material characteristics. In FIGS. 1-3, 5, and 6, shield 150 is mounted on mount 60 above upper end 92 of head 61, and spans a length L of fertilizer tube 140 above upper end 92 of head 91 in front of handle 67 for protecting the length L of fertilizer tube in front of handle 61 from soil and rocks and agricultural crop material. In this example, shield 150 is a generally U-shaped member including opposed, parallel side walls 151 and 152 that extend outwardly from either side of end wall 153. The free ends of side walls 151 and 152 are connected to either side of handle 67, and side walls 151 and 152 extend forwardly therefrom to end wall 153 forming a channel 155 ahead of handle 67 though which length L of fertilizer tube 140 extends. In this example, the free ends of side walls 151 and 152 are connected removably to handle 67 by suitable nut-and-bolt fasteners 157 that extend through appropriate holes therein.

The above discussion is limited to the operation of one implement 50. Those having regard for the art will readily appreciate that a plow frame can incorporate ten, twenty, thirty, forty, or perhaps fifty or more such concurrently operating implements 50 to provide the concurrent seeding and fertilizing of numerous furrows.

Figure 21:
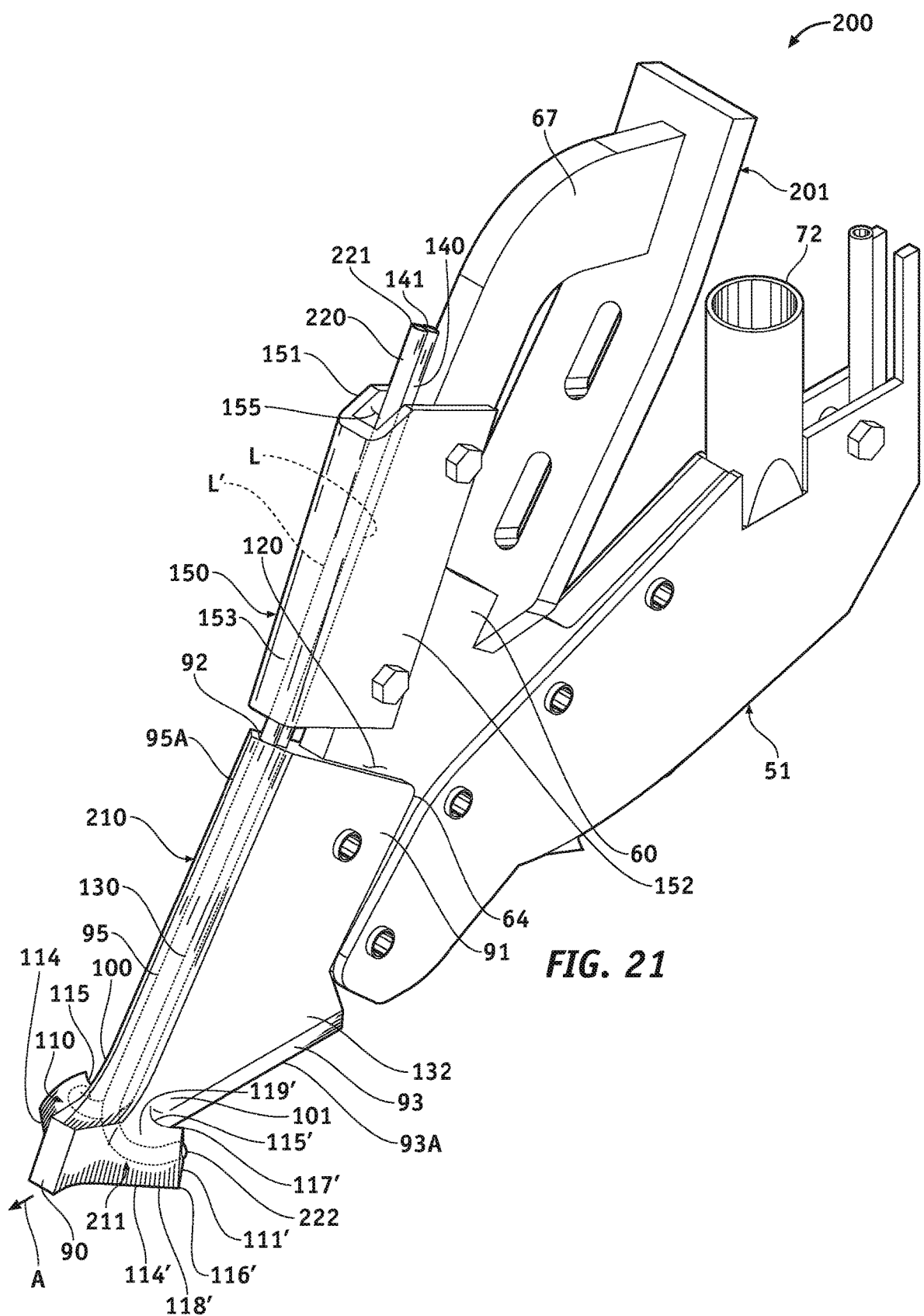
FIG. 21 is a front perspective view of another embodiment of an agricultural implement for working soil across which the agricultural implement travels or is towed, the agricultural implement includes a mount having a leading end, a head having a trailing extremity mounted on the leading end of the mount and a leading extremity for cutting into soil ahead of the mount, a first fertilizer tube extending through the head to a first discharge end at the leading extremity of the head for discharging a stream of fertilizer into the soil from a first side of the leading extremity of the head, a second fertilizer tube extending through the head to a second discharge end at the leading extremity of the head for discharging a stream of fertilizer into the soil from a second side of the leading extremity of the head, and a shield mounted on the mount above the head that spans lengths of the respective first and second fertilizer tubes above the head for protecting the lengths of the respective first and second fertilizer tubes from soil and rocks and agricultural crop material, the lengths of the first and second fertilizer tubes extending through the shield and the head being depicted in phantom line.
Figure 22:
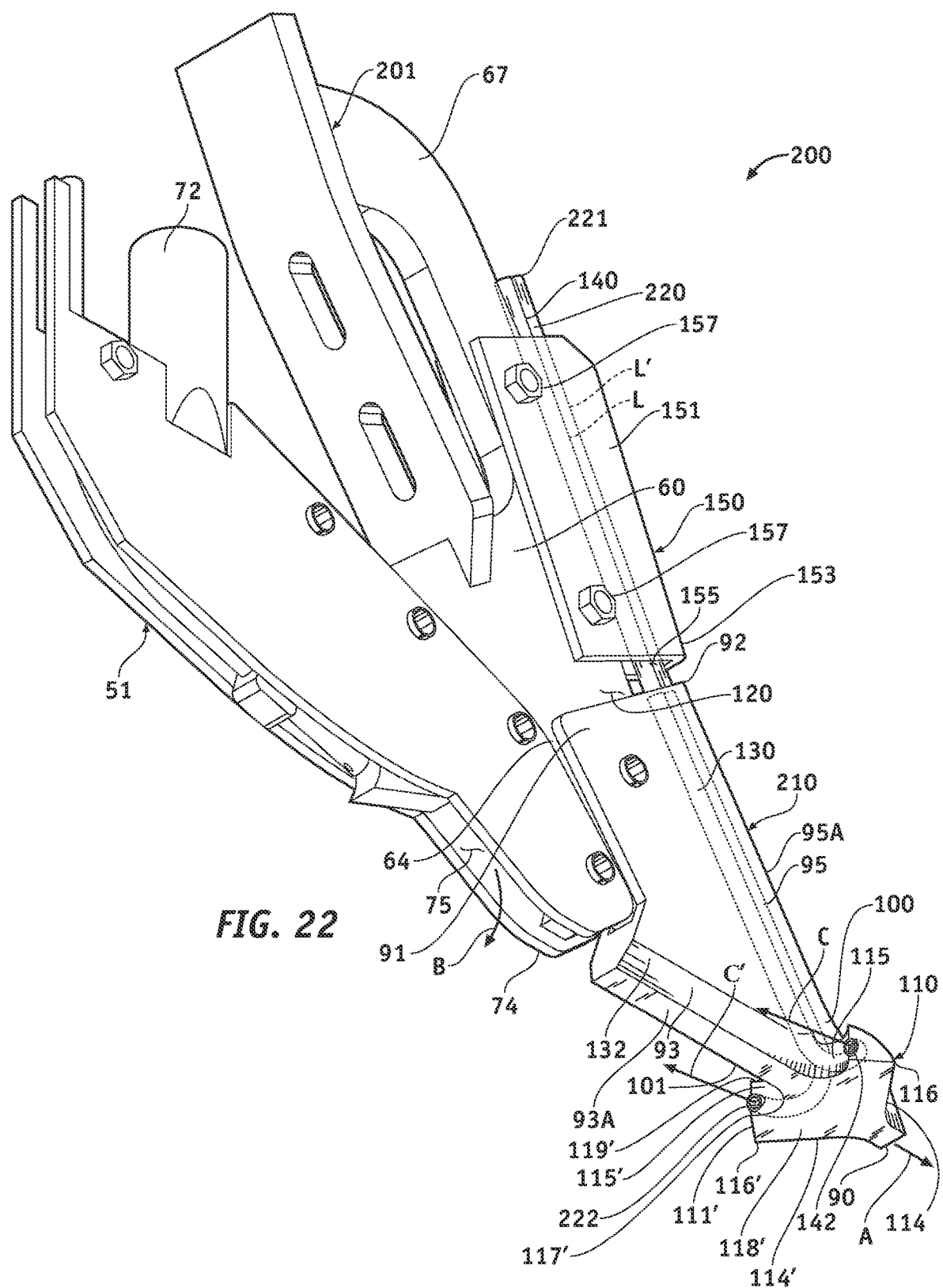
FIG. 22 is a bottom rear perspective view of the embodiment of FIG. 21, the portions of the first and second fertilizer tubes extending through the shield and the head being depicted in phantom line.
Figure 23:
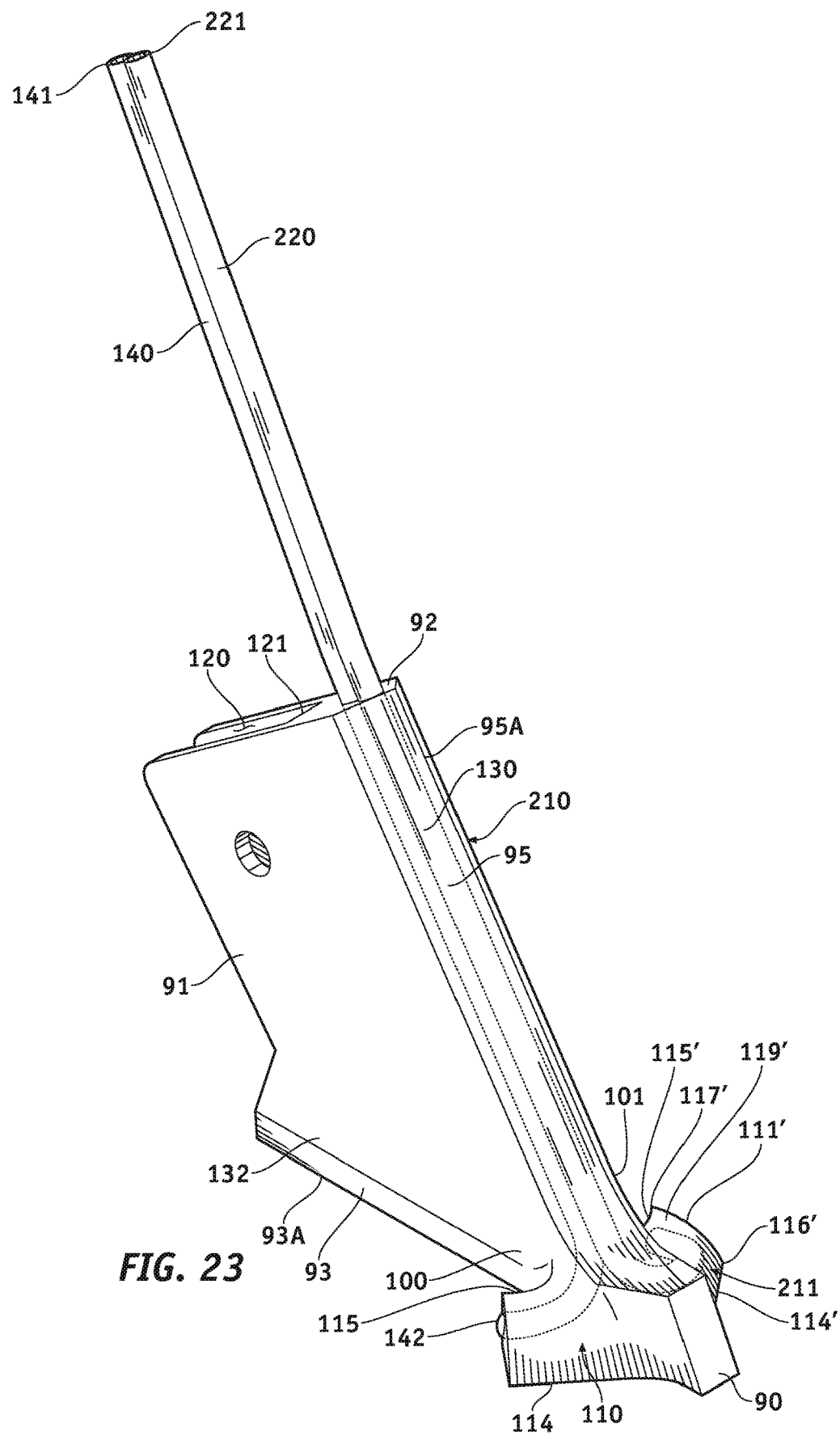
FIG. 23 is a top front right side perspective view of the head of the embodiment of FIG. 21, the portions of the first and second fertilizer tubes extending through the head being depicted in phantom line.
Figure 24:
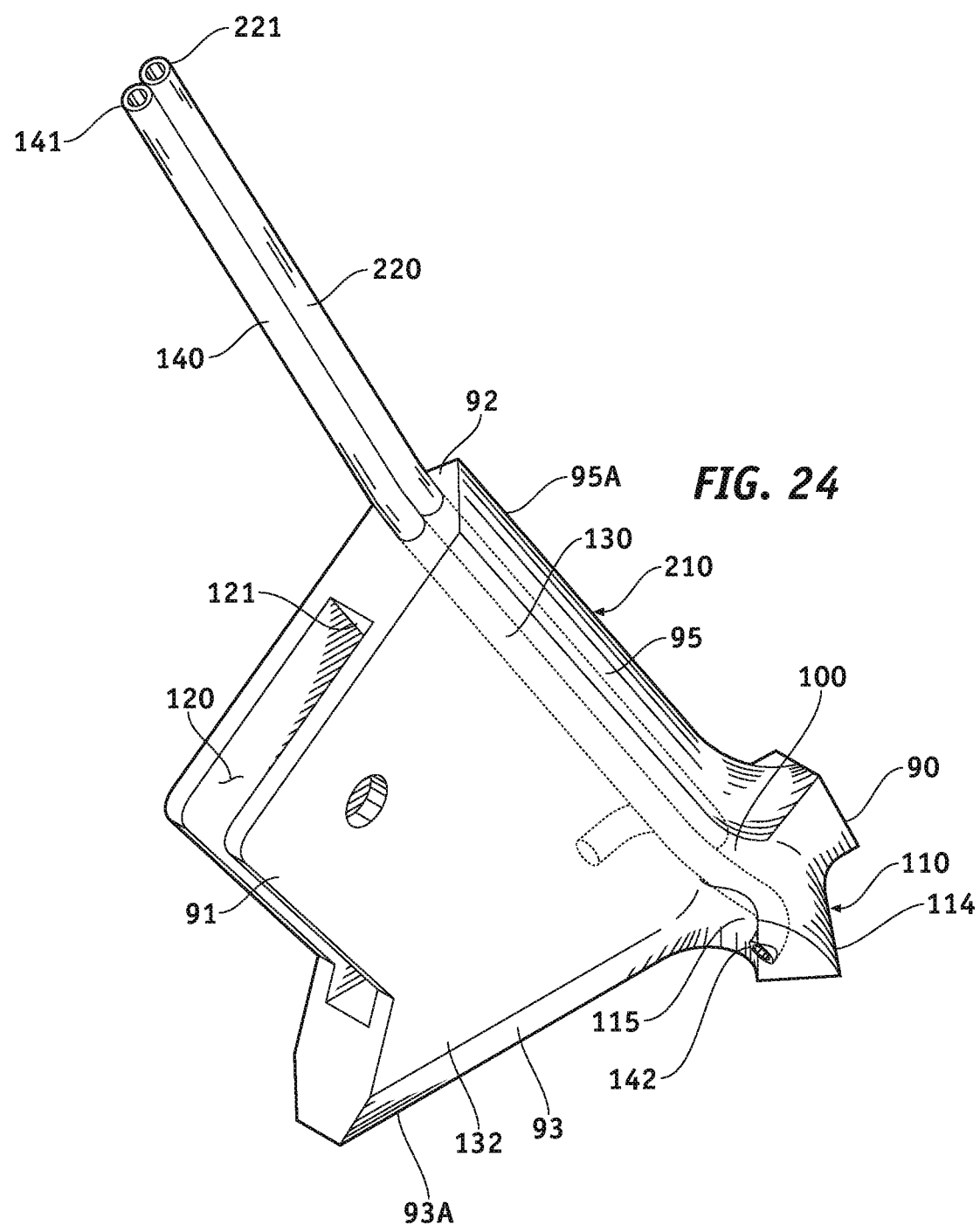
FIG. 24 is a top rear right side perspective view of the embodiment of FIG. 23, the portions of the first and second fertilizer tubes extending through the head being depicted in phantom line.
Figure 25:
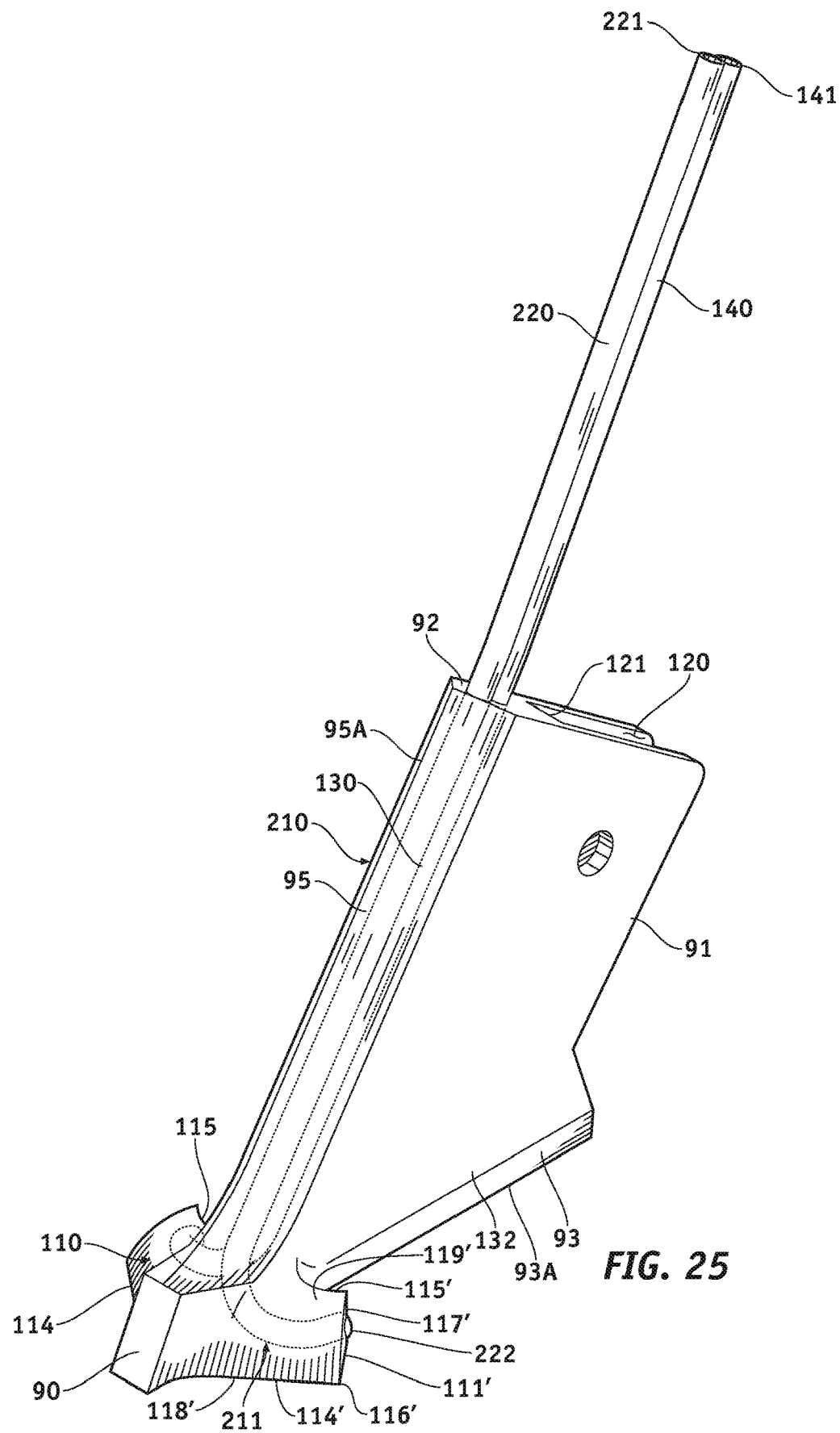
FIG. 25 is a top front left side perspective view of the embodiment of FIG. 23, the portions of the first and second fertilizer tubes extending through the head being depicted in phantom line.
Figure 26:
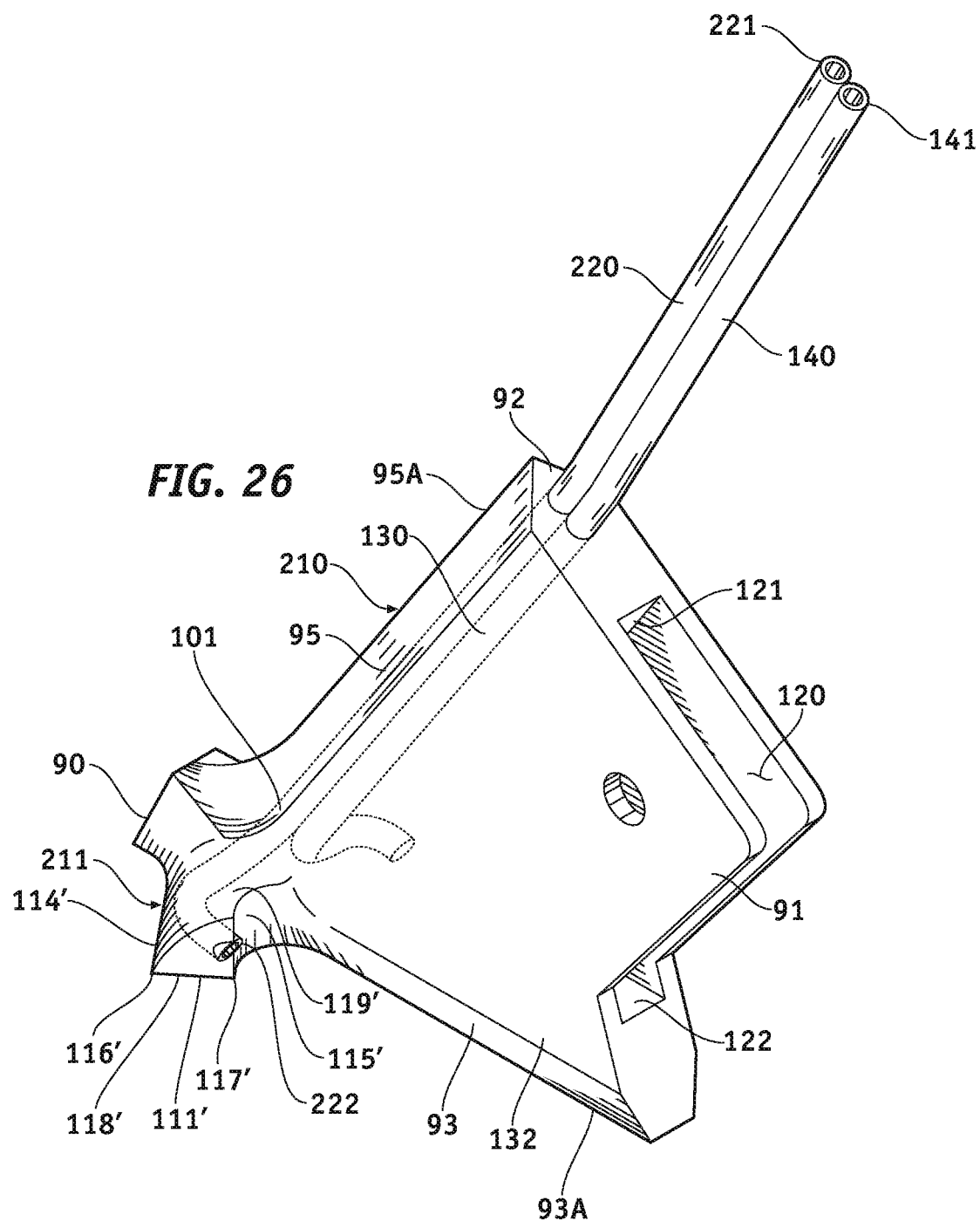
FIG. 26 is a top rear left side perspective view of the embodiment of FIG. 23, the portions of the first and second fertilizer tubes extending through the head being depicted in phantom line.
Figure 27:
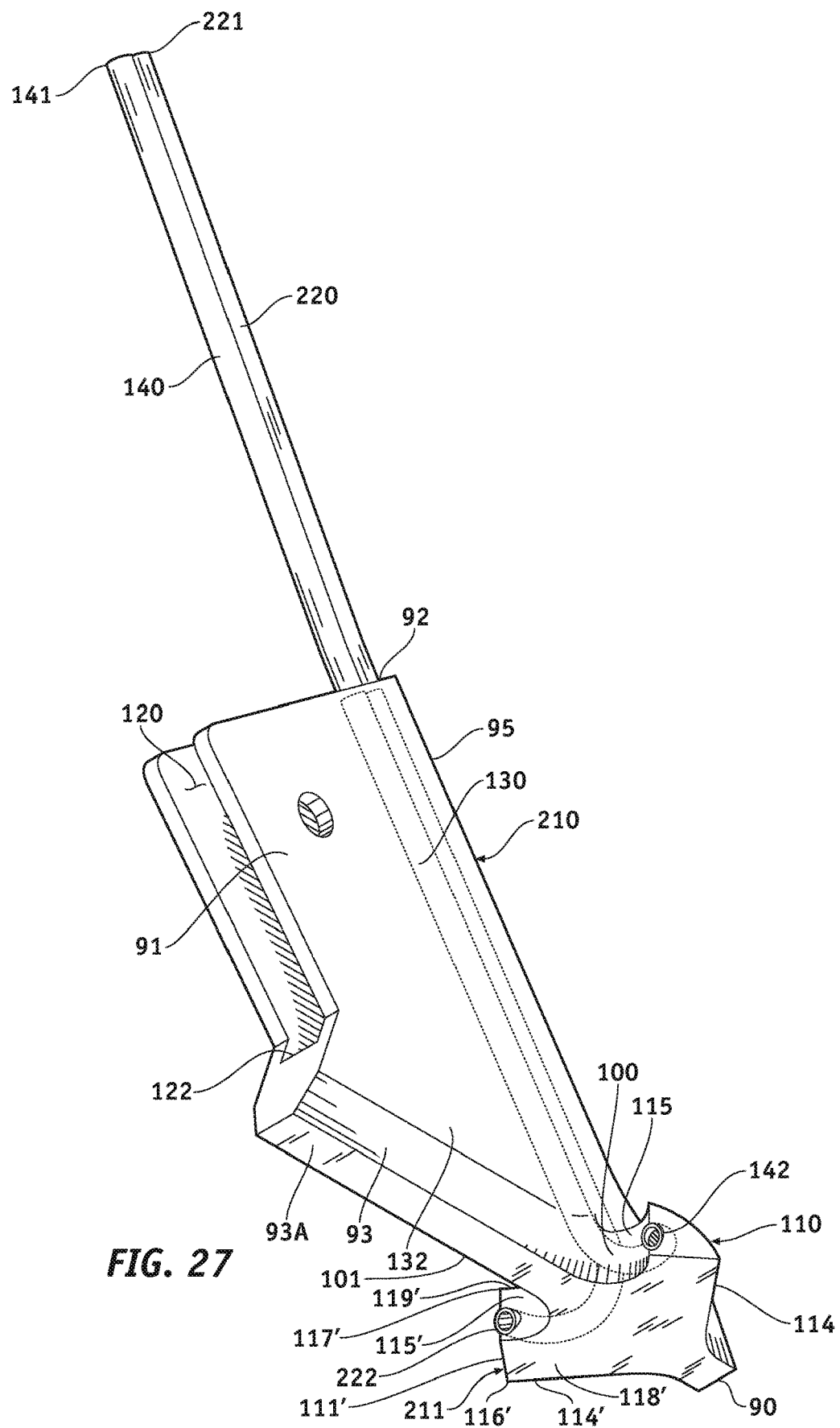
FIG. 27 is a bottom rear right side perspective view of the embodiment of FIG. 23, the portions of the first and second fertilizer tubes extending through the head being depicted in phantom line.
Figure 28:
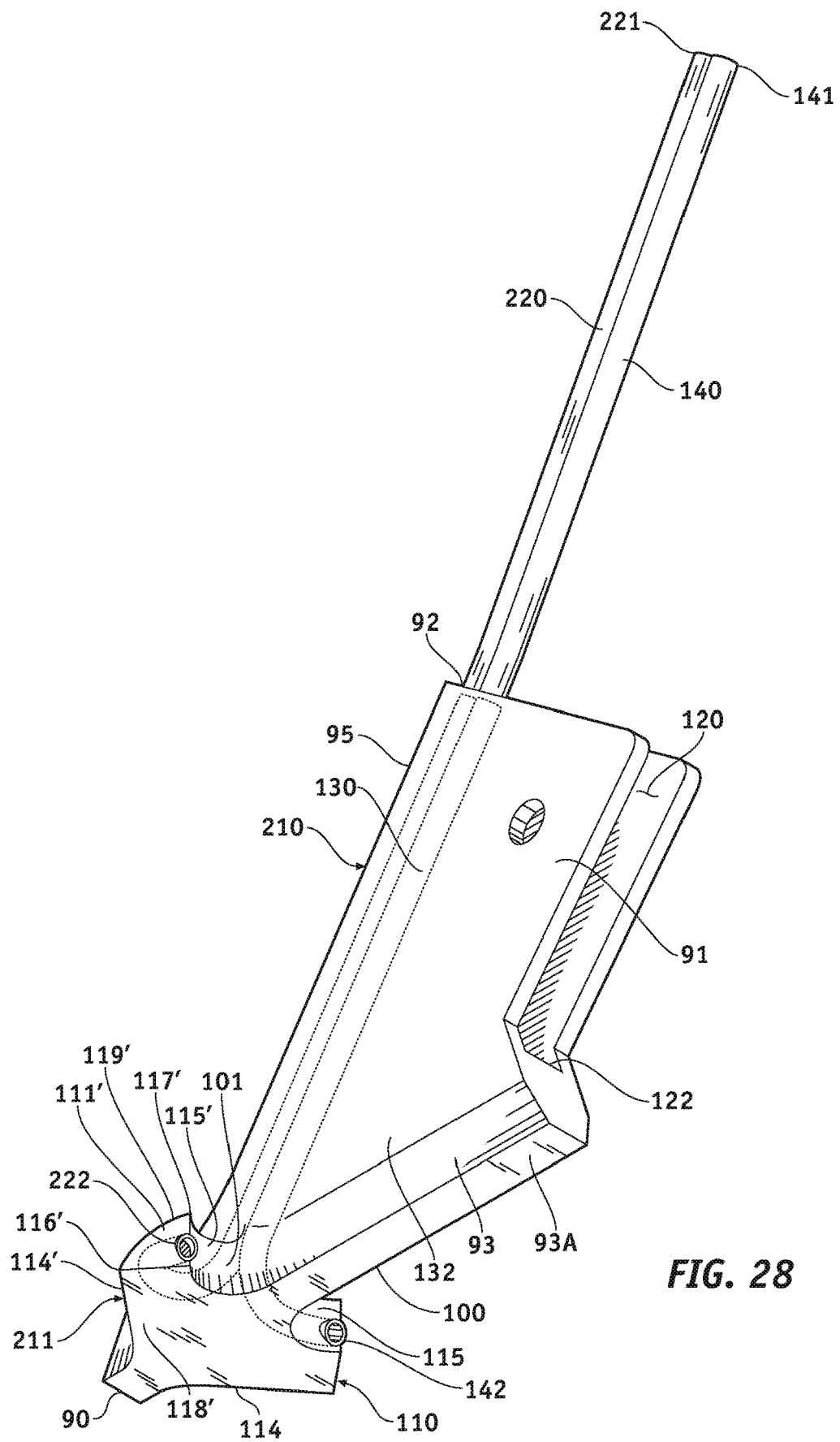
FIG. 28 is a bottom rear left side perspective view of the embodiment of FIG. 23, the portions of the first and second fertilizer tubes extending through the head being depicted in phantom line.
Figure 29:
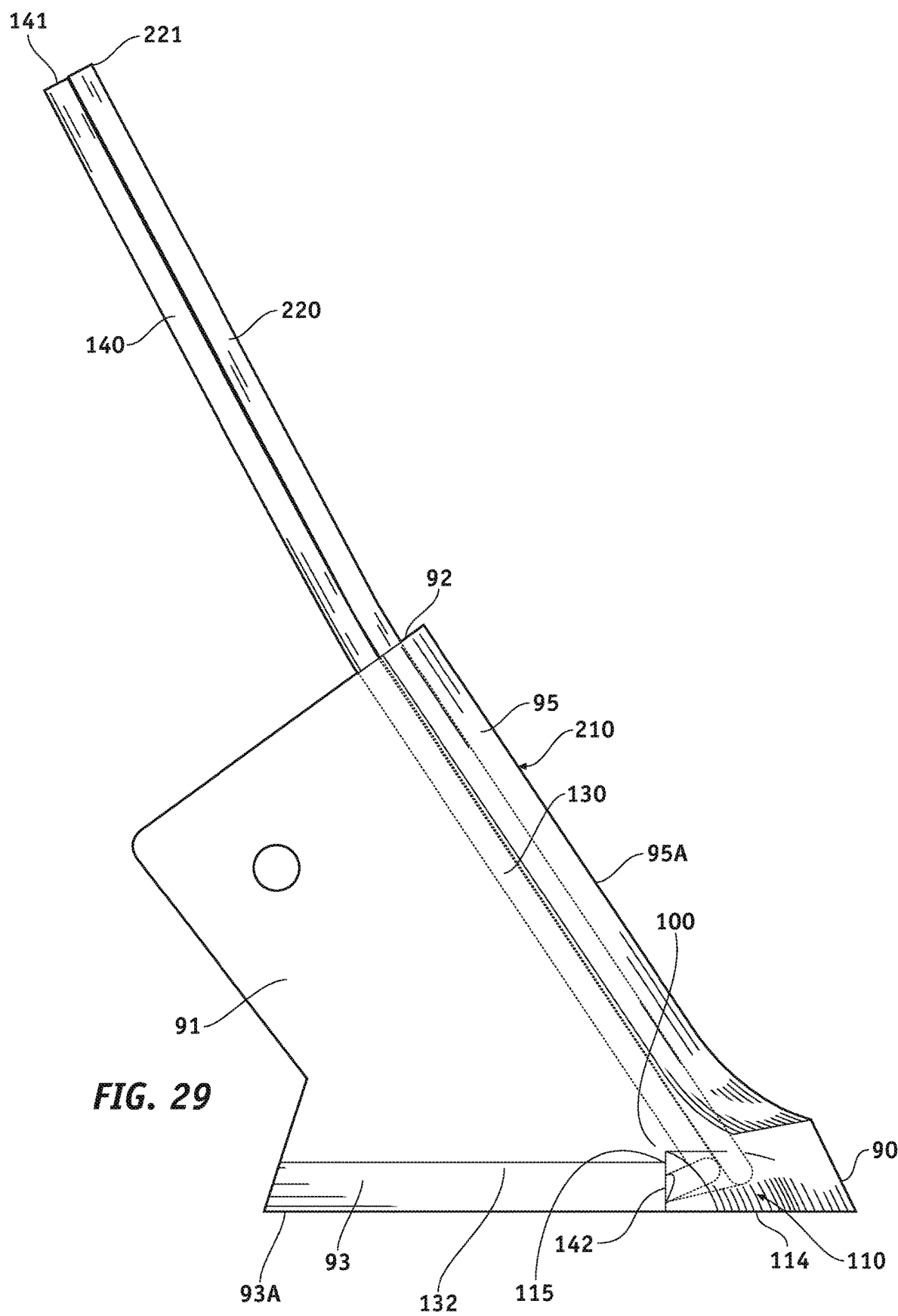
FIG. 29 is a right side elevation view of the embodiment of FIG. 23, the portions of the first and second fertilizer tubes extending through the head being depicted in phantom line.
Figure 30:
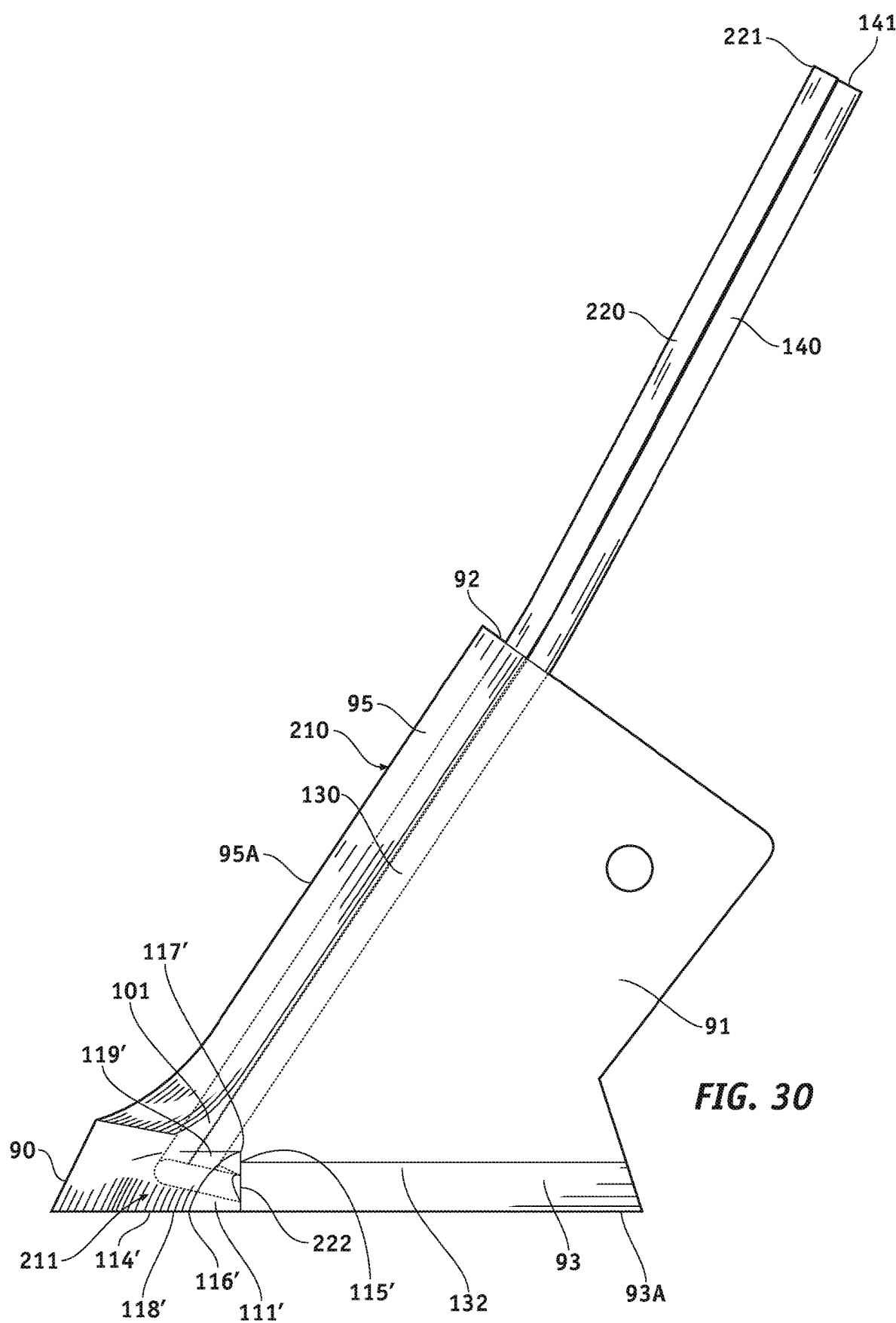
FIG. 30 is a left side elevation view of the embodiment of FIG. 23, the portions of the first and second fertilizer tubes extending through the head being depicted in phantom line.
Figure 31:
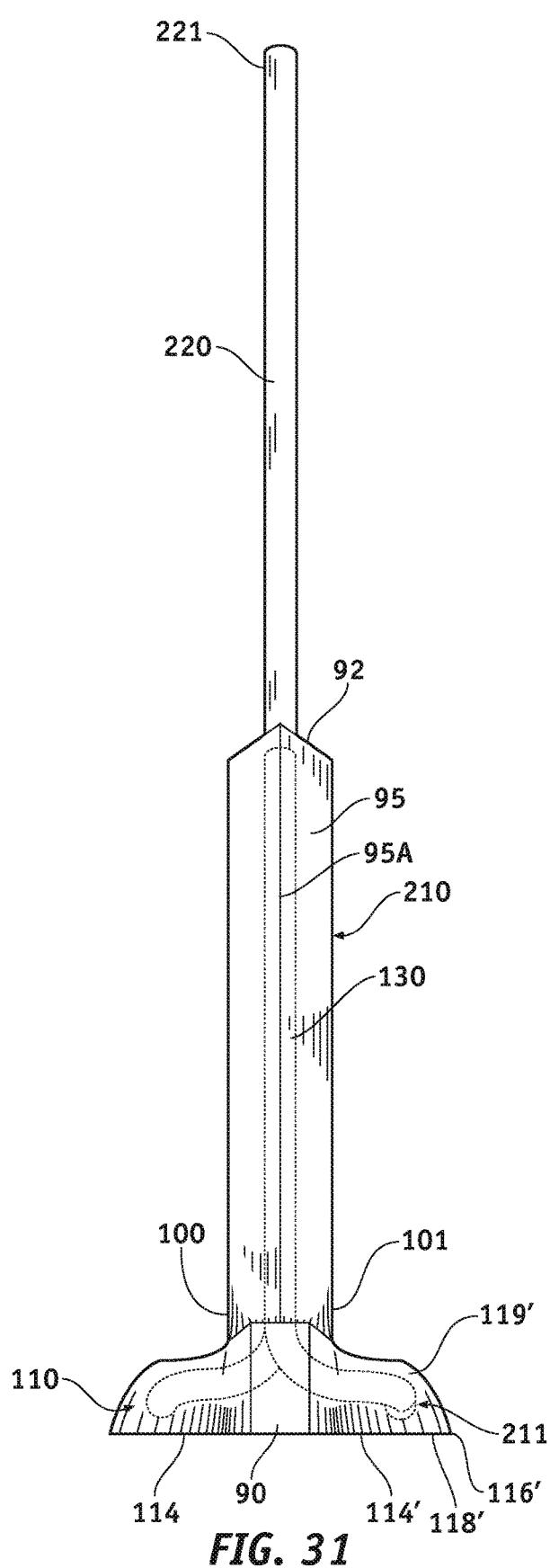
FIG. 31 is a front elevation view of the embodiment of FIG. 23, the portions of the first and second fertilizer tubes extending through the head being depicted in phantom line.

Attention is now directed to FIGS. 21 and 22 in which there is seen another embodiment of an agricultural seeder implement 200 constructed and arranged in accordance with the principle of the invention. In common with implement 50, implement 200 shares seed boot 51, mount 60, and shield 150 discussed in detail above in the embodiment denoted generally at 50, in addition to an alternate embodiment of a head denoted generally at 210. Head 210 and mount 60 form an alternate embodiment of an opener 201, when head 210 is mounted on leading end 64 of mount 60 in FIGS. 21 and 22 in the same way head 61 is mounted to leading end 64 of mount 60 discussed above in connection with implement 50.

Figure 32:
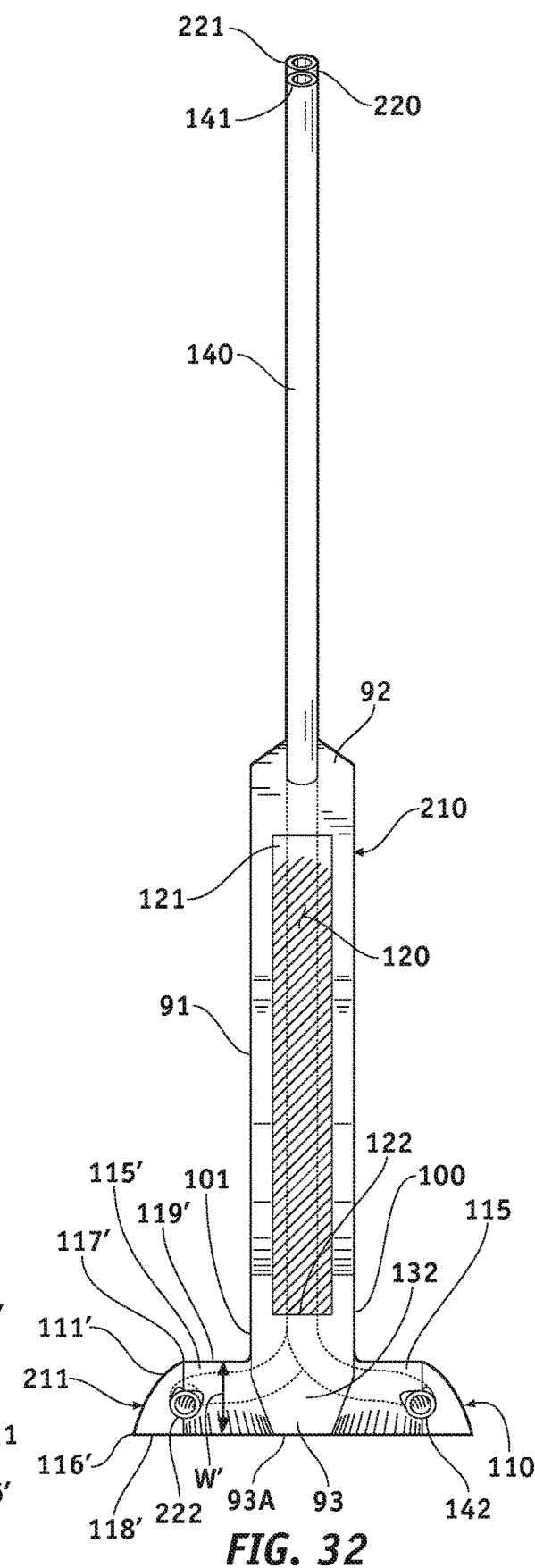
FIG. 32 is a rear elevation view of the embodiment of FIG. 23, the portions of the first and second fertilizer tubes extending through the head being depicted in phantom line.
Figure 33:
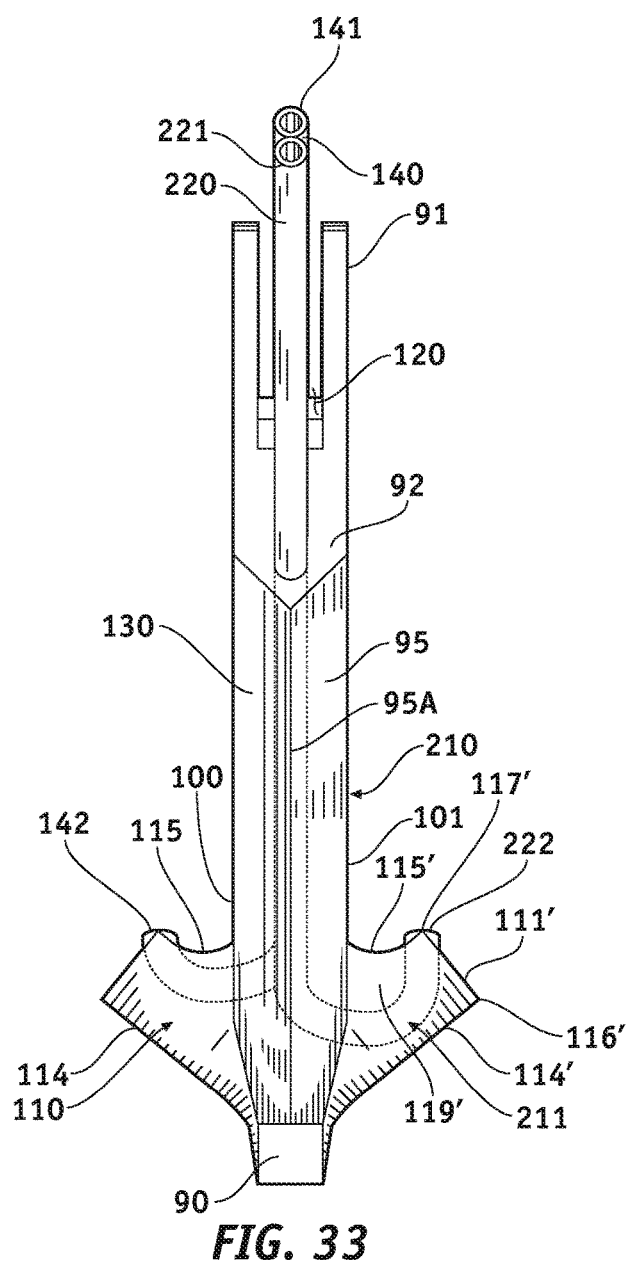
FIG. 33 is a top plan view of the embodiment of FIG. 23, the portions of the first and second fertilizer tubes extending through the head being depicted in phantom line.
Figure 34:
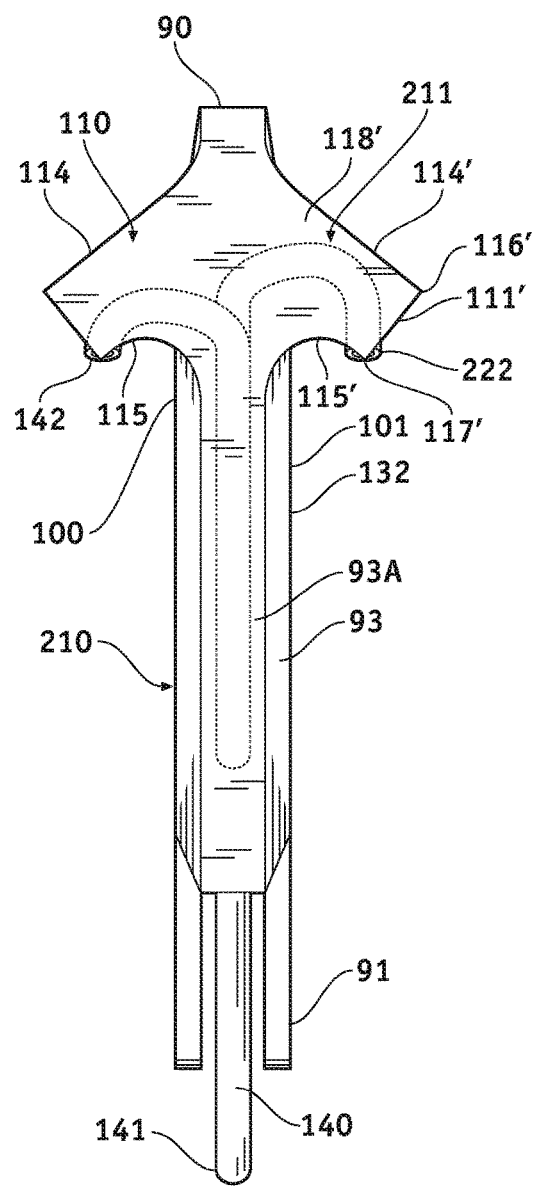
FIG. 34 is a bottom plan view of the embodiment of FIG. 23, the portions of the first and second fertilizer tubes extending through the head being depicted in phantom line.

Referring in relevant part to FIGS. 23-34, head 210 is identical to head 61 in that head 210 shares leading extremity 90 including sides 100 and 101 and knife 110, trailing extremity 91, upper end 92, lower end 93, lower surface 93A, forward end 95, leading edge 95A, slot 120 for accepting leading end 64 of mount 60, leading bulk 130, lower bulk 132, and fertilizer tube 140. In addition to knife 110, leading extremity 90 of head 210 further includes knife 211. Knife 211 forms a part of leading extremity 90 and is opposite to and is the mirror image of knife 110. Knife 211 extends laterally outward from side 101 to distal end 111', which is flat. Knife 211 is identical to knife 110, and the reference characters used to describe knife 110 are also used in connection with knife 211 and include prime ("'") symbols for clarity. Knife 211 has leading edge 114', which is a soil cutting edge, that extends from side 101 to outermost corner 116' of distal end 111', and trailing end 115' that extends from side 101 to intermediate corner 117' of distal end 111'. Knife 211 enlarges from leading edge 114' to trailing end 115' along the length of knife 211 from side 101 to distal end 111'. Knife 211 is swept back from leading extremity 90 to distal end 111', and distal end 111' faces outwardly from side 101 and is angled rearwardly from leading extremity 90. Distal end 111' intersects leading edge 114' at outermost corner 116' of knife 211, and distal end 111' intersects trailing end 115' at intermediate corner 117' of knife 211. Intermediate corner 117' of knife 211, which is a part of distal end 111', is between outermost corner 116' and side 101. As best seen in FIG. 32, trailing end 115' has upright width W' that extends from lower end 118' to upper end 119'. Intermediate corner 117' extends from lower end 118' to upper end 119'. Lower end 118', which is flat, extends forwardly and horizontally from trailing end 115' to leading edge 114', and upper end 119' extends forwardly and inclines downwardly to leading edge 114'.

In addition to fertilizer tube 140, head 210 further includes fertilizer tube 220. Fertilizer tube 220 is elongate and includes inlet 221 for being connected to a source of a fertilizer, and an outlet 222. Fertilizer tube 220 extends from inlet 221 and through head 61 to outlet 222. Fertilizer tube 220 is for guiding a stream of fertilizer from inlet 221 and through head 61 to outlet 222 for discharging the stream of fertilizer into the soil from head 61. The material of head 210 is molded around fertilizer tubes 140 and 220.

Outlet 222 of fertilizer tube 220 is located at leading extremity 90 for discharging the stream of fertilizer outwardly from leading extremity 90, relative to side 101 or otherwise along side 101 of leading extremity 90. More specifically, outlet 222 is located at knife 111 for discharging the stream of fertilizer outwardly from knife 111 of leading extremity 90. Outlet 222 extends across intermediate corner 117' from trailing end 115' to distal end 111' between lower and upper ends 118' and 119' of knife 111 for discharging the stream of fertilizer outwardly relative to side 101 or otherwise along side 101 of leading extremity 90 and, more specifically, outwardly between lower and upper ends 118' and 119' of knife 111 concurrently from distal end 111' and trailing end 115' of knife 111 and from intermediate corner 117'. In this embodiment, fertilizer tube 220 extends from inlet 221 and downwardly through leading bulk 130 from upper end 92 to leading extremity 90 and outturns through knife 111 from side 101 to outlet 222 at intermediate corner 117' of distal end 111' and trailing end 115'.

In use, head 210 is mounted on leading end 64 of mount 60 as in implement 50, implement 50 is suspended from a shank by connecting bracket 66 to the shank, and the shank is connected to a plow frame that is pulled or otherwise advanced by a tractor for pulling or otherwise advancing implement 200 in the direction of arrowed line A in FIGS. 21 and 22 at a chosen depth through the surface of the soil into which seeds are to be planted leading with leading extremity 90 of head 61 that cuts a furrow in the soil. Leading extremity 90 and knives 110 and 211 concurrently cut into the soil to form the furrow when implement 200 is advanced leading extremity 90 first through the soil into which seeds are to be planted. Knives 110 and 211 extending laterally outward from the respective sides 100 and 101 cut into the soil leading edges 114 and 114' first for concurrently cutting and disrupting the soil along the respective sides 100 and 101 of leading extremity 90. The swept back configuration of knives 110 and 211 enables knives 110 and 211 to concurrently cut into the soil leading with the respective leading edges 114 and 114' when implement 200 is advanced through the soil. The enlargement of knife 110 from leading edge 114 to trailing end 115 enables knife 110 to aggressively disrupt the soil along side 100 of leading extremity 90 for loosening the soil along side 100 of leading extremity 90 and forming the furrow. The same enlargement of knife 211 from leading edge 114' to trailing end 115' enables knife 211 to aggressively disrupt the soil along side 101 of leading extremity 90 for loosening the soil along side 101 of leading extremity 90 and forming the furrow. Seeds are conventionally conveyed by an air stream from a seed hopper to conduit 72, which conveys the stream of air-driven seeds into seed boot 51. The stream of air-driven seeds pass through seed boot 51 and downwardly into the furrow cut by head 210 through seed boot outlet 75 in the direction of arrowed line B in FIG. 22. As implement 200 is pulled through and works the ground, the seed is continually deposited downwardly into the furrow through opening 75 of seed boot 51. A chosen fertilizer is continuously conveyed from a fertilizer hopper to inlet 140 of fertilizer tube 140, which conveys the fertilizer from inlet 141 and through head 61 and outwardly into the soil from head 61 through outlet 142 in the direction of arrowed line C in FIG. 22 ahead of the seeds deposited into the furrow through outlet 75 trailing head 61 as discussed above in conjunction with implement 50. At the same time, a chosen fertilizer is continuously conveyed from a fertilizer hopper to inlet 221 of fertilizer tube 220, which conveys the fertilizer from inlet 221 and through head 61 and outwardly into the soil from head 61 through outlet 222 in the direction of arrowed line C' in FIG. 22 ahead of the seeds deposited into the furrow through outlet 75 trailing head 61.

Regarding knife 211 and fertilizer tube 220, outlet 222 is located at leading extremity 90 for discharging the stream of fertilizer outwardly into the soil in the direction of arrowed line C' from leading extremity 90, relative to side 101 or otherwise along side 101. In another aspect, outlet 222 is located at knife 211 for discharging the stream of fertilizer outwardly relative to side 101 or otherwise along side 101 into the soil from knife 211 in the direction of arrowed line C' in FIG. 22. In yet another aspect, outlet 222 is between lower and upper ends 118' and 119' of knife 211 and extends across intermediate corner 117' from trailing end 115' to distal 111' for discharging the stream of fertilizer outwardly into the soil in the direction of arrowed line C' from proximate to distal end 111', namely, from intermediate corner 117' and from trailing end 115' and distal 111' along either side of intermediate corner 117'. The direction of fertilizer deposition from outlet 222 in the direction of arrowed line C' is a rearward direction from distal and trailing ends 111' and 115' of knife 211 into the soil relative to side 101 or otherwise along side 101. The enlargement of knife 211 from leading edge 114' to trailing end 115' aggressively disrupts the soil along side 101 of leading extremity 90 for not only forming the furrow but also loosening the soil to enable the loosened soil to accept the fertilizer deposited therein from distal end 111' of knife 211. Again, the application of the fertilizer from head 61 into the soil ahead of the seeds deposited into the furrow through opening 75 of seed boot 51 trailing or otherwise behind head 61 allows the soil to fold over the applied fertilizer ahead of the deposited seeds for inhibiting the deposited seeds from being laid directly atop the fertilizer and becoming chemically damaged as a result, which reduces seed loss and promotes seed access to the fertilizer applied from head 61 when the seeds germinate. Outlet 222 of fertilizer tube 220 is between lower and upper ends 118' and 119' at intermediate corner 117' between outermost corner 116' and side 101 of leading extremity 90 where distal and trailing ends 111' and 115' intersect, which enables knife 211 to shield outlet 222 from oncoming soil and crop material for preventing outlet 222 from becoming clogged or blocked.

As in implement 50, in implement 200 a chosen fertilizer is also continuously conveyed from a fertilizer hopper to fertilizer tube 80, which conveys the fertilizer therethrough to outlet 81 for application therethrough downwardly into the furrow following the seed deposition into the furrow from opening 75 of seed boot 51.

In FIGS. 21 and 22, shield 150 is mounted on mount 60 above upper end 92 of head 211, and spans lengths L and L' of the respective fertilizer tubes 140 and 220 above upper end 92 of head 91 in front of handle 67 of mount 60 for protecting the respective lengths L and L' of fertilizer tubes 140 and 220 in front of handle 61 from soil and rocks and agricultural crop material. As described above in conjunction with implement 50, shield 150, a generally U-shaped member, includes opposed, parallel side walls 151 and 152 that extend outwardly from either side of end wall 153. Free ends of side walls 151 and 152 are connected to either side of handle 67, and side walls 151 and 152 extend forwardly therefrom to end wall 153 forming a channel 155 ahead of handle 67 though which lengths L and L' of the respective fertilizer tubes 140 and 220 extend. As in implement 50, in implement 200 the free ends of side walls 151 and 152 are connected removably to handle 67 by suitable nut-and-bolt fasteners 157 that extend through appropriate holes therein.

The above discussion is limited to the operation of one implement 200. Those having regard for the art will readily appreciate that a plow frame can incorporate ten, twenty, thirty, forty, or perhaps fifty or more such concurrently operating implements 200 to provide the concurrent seeding and fertilizing of numerous furrows.

Figure 37:
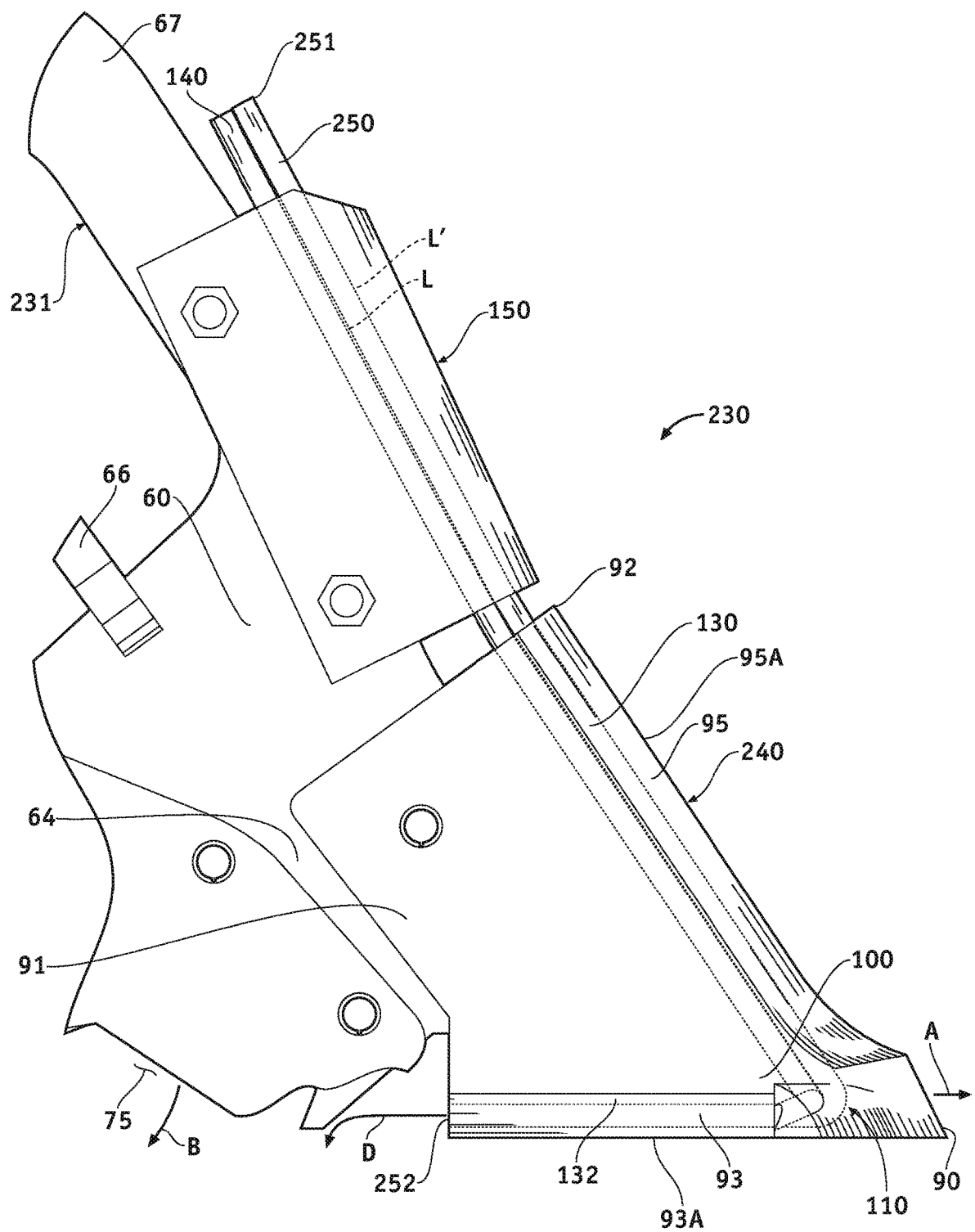
FIG. 37 is a top rear left side perspective view of the embodiment of FIG. 35, the portions of the first and second fertilizer tubes extending through the head being depicted in phantom line.

Attention is now directed to FIG. 37 in which there is seen another embodiment of an agricultural seeder implement 230 constructed and arranged in accordance with the principle of the invention. In common with implement 50, implement 230 shares seed boot 51, mount 60, and shield 150 discussed in detail above in the embodiment denoted generally at 50, in addition to an alternate embodiment of a head denoted generally at 240. Head 240 is mounted on mount 60 as in implement 50. Head 240 and mount 60 form an alternate embodiment of an opener 231, when head 240 is mounted on leading end 64 of mount 60 in FIG. 35 in the same way head 61 is mounted to leading end 64 of mount 60 discussed above in connection with implement 50.

Referring in relevant part to FIGS. 35 and 36, head 240 is identical in every respect to head 61 in that head 240 shares leading extremity 90 including sides 100 and 101 and knife 110, trailing extremity 91, upper end 92, lower end 93, lower surface 93A, forward end 95, leading edge 95A, slot 120, including the forward end thereof defined by forward end surface 121 and the lower end thereof defined by lower end surface 122, leading bulk 130, lower bulk 132, and fertilizer tube 140.

In addition to fertilizer tube 140, head 240 further includes fertilizer tube 250. Fertilizer tube 250 is elongate and includes inlet 251 for being connected to a source of a fertilizer, and an outlet 252. Fertilizer tube 250 extends from inlet 251 and through head 61 to outlet 252. Fertilizer tube 250 is for guiding a stream of fertilizer from inlet 251 and through head 240 to outlet 252 for discharging the stream of fertilizer into the soil from head 240. The material of head 240 is molded around fertilizer tubes 140 and 250.

Outlet 252 of fertilizer tube 250 is located at trailing extremity 91 for discharging the stream of fertilizer outwardly from trailing extremity 91. In this embodiment, fertilizer tube 250 extends from inlet 251 and downwardly through leading bulk 130 from upper end 92 to leading extremity 90 like fertilizer tube 140, and in-turns rearwardly from leading extremity 90 and into lower bulk 132 and extends through lower bulk 132 along lower end 93 from leading extremity 90 to trailing extremity 91 of lower bulk 132 at lower end 93 of head 240.

In use, implement 230 is suspended from a shank by connecting bracket 66 to the shank, and the shank is connected to a plow frame that is pulled or otherwise advanced by a tractor for pulling or otherwise advancing implement 230 in the direction of arrowed line A in FIG. 37 at a chosen depth through the surface of the soil into which seeds are to be planted leading with leading extremity 90 of head 61 that cuts a furrow in the soil. Identically to implement 50, leading extremity 90 and knife 110 cut into the soil to form the furrow when implement 200 is advanced leading extremity 90 first through the soil into which seeds are to be planted, seeds are conventionally conveyed through seed boot 51 and into the furrow through outlet 75 from seed boot 51 in the direction of arrowed line B, and a chosen fertilizer is continuously conveyed from a fertilizer hopper and into the furrow via fertilizer tube 140 as discussed previously. At the same time, in implement 230 a chosen fertilizer is continuously conveyed from a fertilizer hopper to inlet 251 of fertilizer tube 250, which conveys the fertilizer from inlet 251 and through head 61 and outwardly into the soil from trailing extremity 91 of lower bulk 132 of head 240 through outlet 252 in the direction of arrowed line D in FIG. 37 ahead of the seeds deposited into the furrow through outlet 75 trailing head 61 and behind the fertilizer deposited into the furrow from leading extremity 90 via fertilizer tube 140.

Identically to implement 200, in implement 230 shield 150 is mounted on mount 60 above upper end 92 of head 211 in FIG. 35, and spans lengths L and L' of the respective fertilizer tubes 140 and 250 above upper end 92 of head 91 in front of handle 67 of mount 60 for protecting the respective lengths L and L' of fertilizer tubes 140 and 250 in front of handle 61 from soil and rocks and agricultural crop during the described use of implement 230.

The above discussion is limited to the operation of one implement 230. Those having regard for the art will readily appreciate that a plow frame can incorporate ten, twenty, thirty, forty, or perhaps fifty or more such concurrently operating implements 230 to provide the concurrent seeding and fertilizing of numerous furrows.

Those having regard for the art will readily appreciate that various cutting heads useful with agricultural seeder implements are disclosed, which each enable the cutting a furrow into the ground to be planted and the concurrently application of fertilizer therefrom ahead of the deposited seeds. Because the described connection of each cutting head to the mount of the agricultural seeder implement is a non-destructive, removable and impermanent connection, the skilled farmer may easily configure and reconfigure an agricultural seeder implement with any of the exemplary cutting heads as needed for effecting a particular fertilizer application, i.e.

the application of one or more chosen fertilizers, from the chosen head as disclosed herein without having to modify or replace the mount or the seed boot of the agricultural seeder implement, in accordance with the principle of the invention.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. An agricultural implement for working soil across which the agricultural implement travels or is towed, comprising:
    an opener comprising a mount and a cutting head, the mount configured to be coupled to a shank of a plow frame and including a leading end and a trailing end, and the cutting head including a leading extremity;
    the cutting head connected removably to the leading end and extending forwardly from the leading end to the leading extremity comprising a forwardmost part of the opener ahead of the leading end of the mount, the leading extremity configured to cut into the soil and comprising a first side, a second side, and a knife including a soil-cutting leading edge, a trailing end, and a distal end, the knife extending outwardly from the first side to the distal end, the soil-cutting leading edge extending between the first side and the distal end, and the trailing end behind the soil-cutting leading edge; and
    a fertilizer tube including an inlet configured to be connected to a source of fertilizer and an outlet configured to discharge fertilizer, the fertilizer tube extending into the cutting head from the inlet through the leading extremity ahead of the leading end of the mount and to and through the knife to the outlet ahead of the leading end of the mount and proximate to the trailing end between the distal end and the first side.

2. The agricultural implement according to claim 1, wherein a length of the fertilizer tube extends outwardly from the cutting head to the inlet and is not a part of the mount.

3. The agricultural implement according to claim 1, wherein the knife is swept back.

4. A soil cutting head configured to be connected to a leading end of a mount to form an agricultural opener, the soil cutting head comprising:
    a body including a trailing extremity and a leading extremity, the body extending forwardly from the trailing extremity to the leading extremity comprising a forwardmost part of the body;
    the trailing extremity comprising a slot configured to receive the leading end of the mount, the trailing extremity configured to be connected removably to the leading end of the mount when the leading end of the mount is received by the slot;
    the leading extremity ahead of the slot, configured to cut into the soil, and comprising a first side, a second side, and a knife including a soil-cutting leading edge, a trailing end, and a distal end, the knife extending outwardly from the first side to the distal end, the soil-cutting leading edge extending between the first side and the distal end, and the trailing end behind the soil-cutting leading edge; and
    a fertilizer tube including an inlet configured to be connected to a source of fertilizer and an outlet configured to discharge fertilizer, the fertilizer tube extending into the body from the inlet through the leading extremity ahead of the slot and to and through the knife to the outlet ahead of the slot and proximate to the trailing end between the distal end and the first side;
    wherein the mount is configured to be coupled to a shank of a plow frame.

5. The soil cutting head according to claim 4, wherein a length of the fertilizer tube extends outwardly from the body to the inlet and is not a part of a mount when the body is connected to the mount.

6. The soil cutting head according to claim 4, wherein the knife is swept back.

* * * * *